United States Patent [19]

Smith

[11] Patent Number: 5,253,107
[45] Date of Patent: Oct. 12, 1993

[54] PANORAMIC INTERACTIVE SYSTEM INCLUDING COORDINATED MOVEMENT OF A FILM RECORD WITHIN A VIEWING HEAD

[76] Inventor: Graham T. Smith, 36 Robinson Street, Toronto, Ontario, Canada

[21] Appl. No.: 770,105

[22] Filed: Oct. 2, 1991

Related U.S. Application Data

[63] Continuation-in-part of Ser. No. 737,148, Jul. 29, 1991, Pat. No. 5,153,716, which is a continuation-in-part of Ser. No. 601,232, Oct. 22, 1990, Pat. No. 5,040,055, which is a continuation-in-part of Ser. No. 448,263, Dec. 11, 1989, Pat. No. 4,985,762.

[51] Int. Cl.$^5$ .................. G02B 27/22; G03B 37/00
[52] U.S. Cl. .................. 359/469; 359/472; 359/477
[58] Field of Search .......... 359/463, 466–469, 359/472, 477, 725, 896; 358/87; 352/69; 353/7

[56] References Cited

U.S. PATENT DOCUMENTS

| | | | |
|---|---|---|---|
| 899,862 | 9/1908 | Crocker et al. | 359/472 |
| 2,966,096 | 12/1960 | D'Incerti et al. | 352/69 |
| 3,473,870 | 10/1969 | Platt | 359/469 |
| 3,850,505 | 11/1974 | Ratlift | 359/474 |
| 3,980,394 | 9/1976 | Zapf | 359/473 |
| 4,078,860 | 3/1978 | Globus et al. | 359/725 |
| 4,116,533 | 9/1978 | Nerlich | 359/475 |
| 4,221,462 | 9/1980 | Huvers | 359/470 |
| 4,695,129 | 9/1987 | Faessen et al. | 353/7 |

*Primary Examiner*—Jon W. Henry

[57] ABSTRACT

An image viewing system is disclosed for viewing images recorded on a film record in a particular known angular relationship. The viewing system comprises a rotatable viewing head for selective viewing of portions of the film record as a function of the angular position of the viewing head. As the viewing head is rotated, the film record is adjusted to reflect a similar angular movement in the scenes of the film record. This arrangement corresponds to the dynamics involved if the user was to actually view the scenes of the film record.

9 Claims, 24 Drawing Sheets

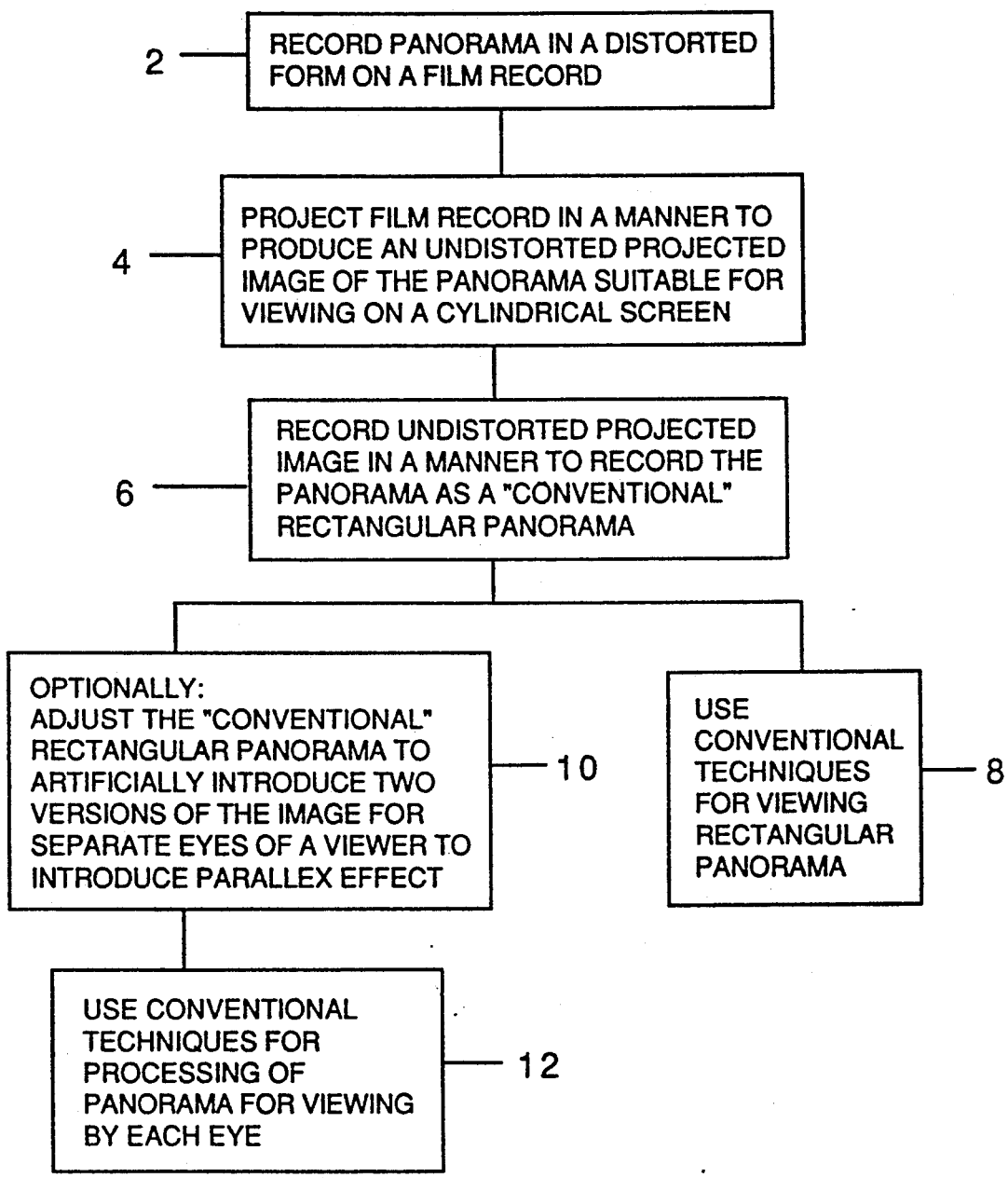

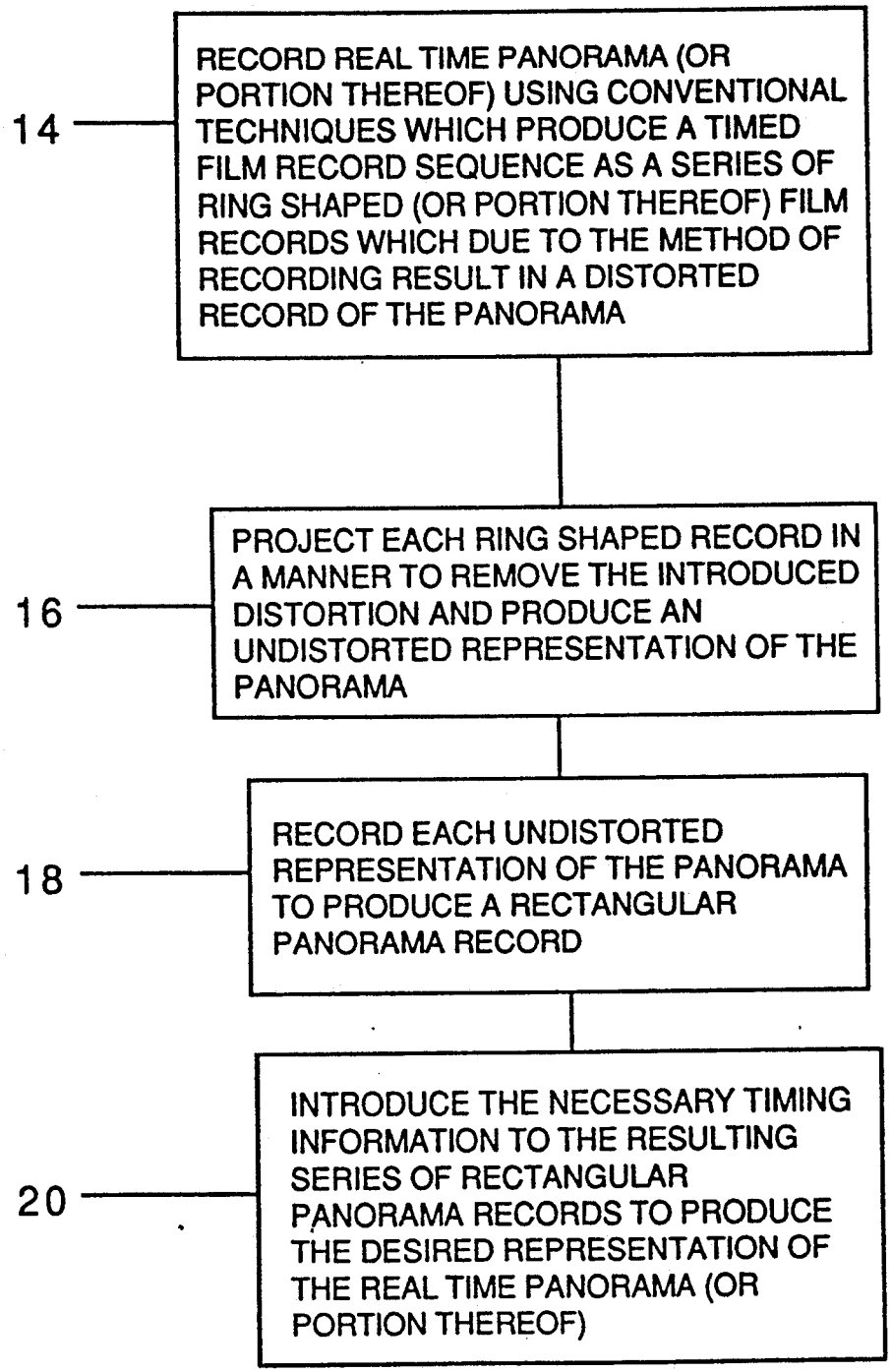

P-LENSES TYPE A   FIG. 3.
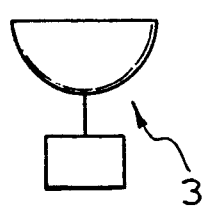
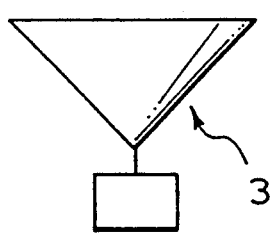
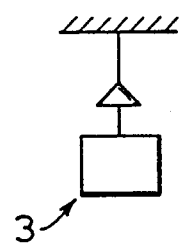
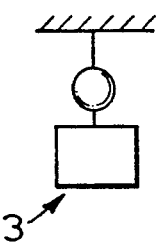
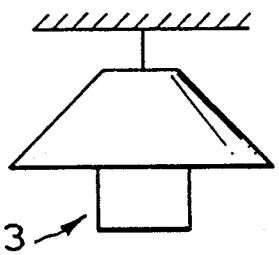
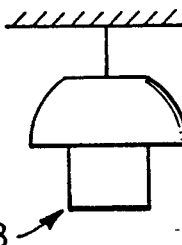
P-LENSES TYPE B
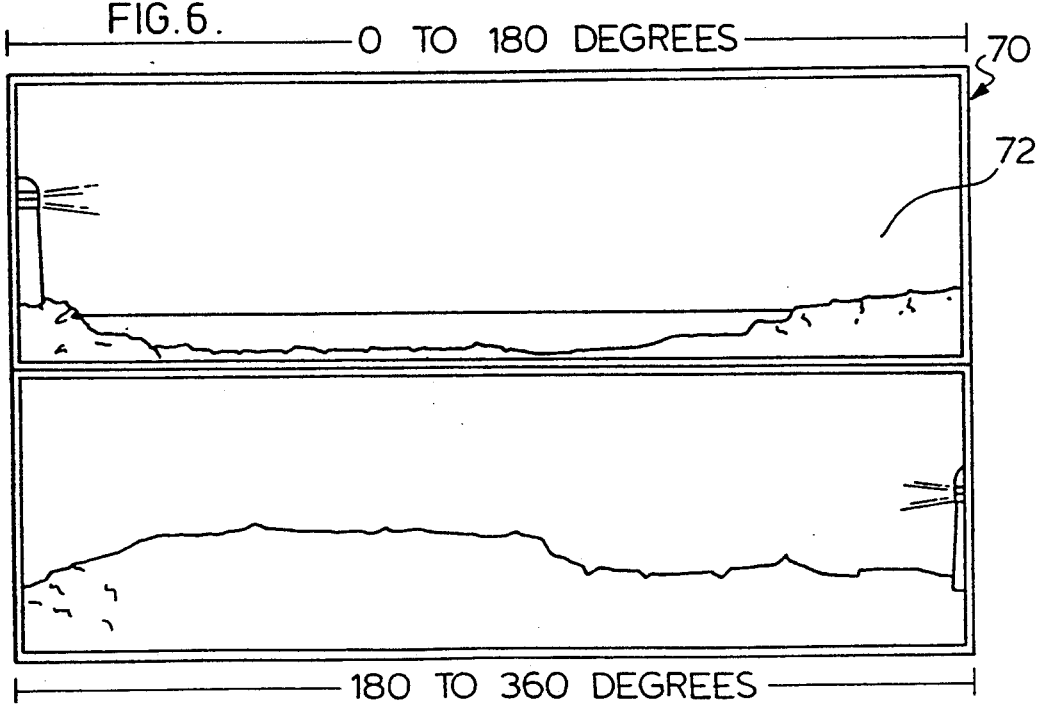
FIG. 6.   0 TO 180 DEGREES
180 TO 360 DEGREES

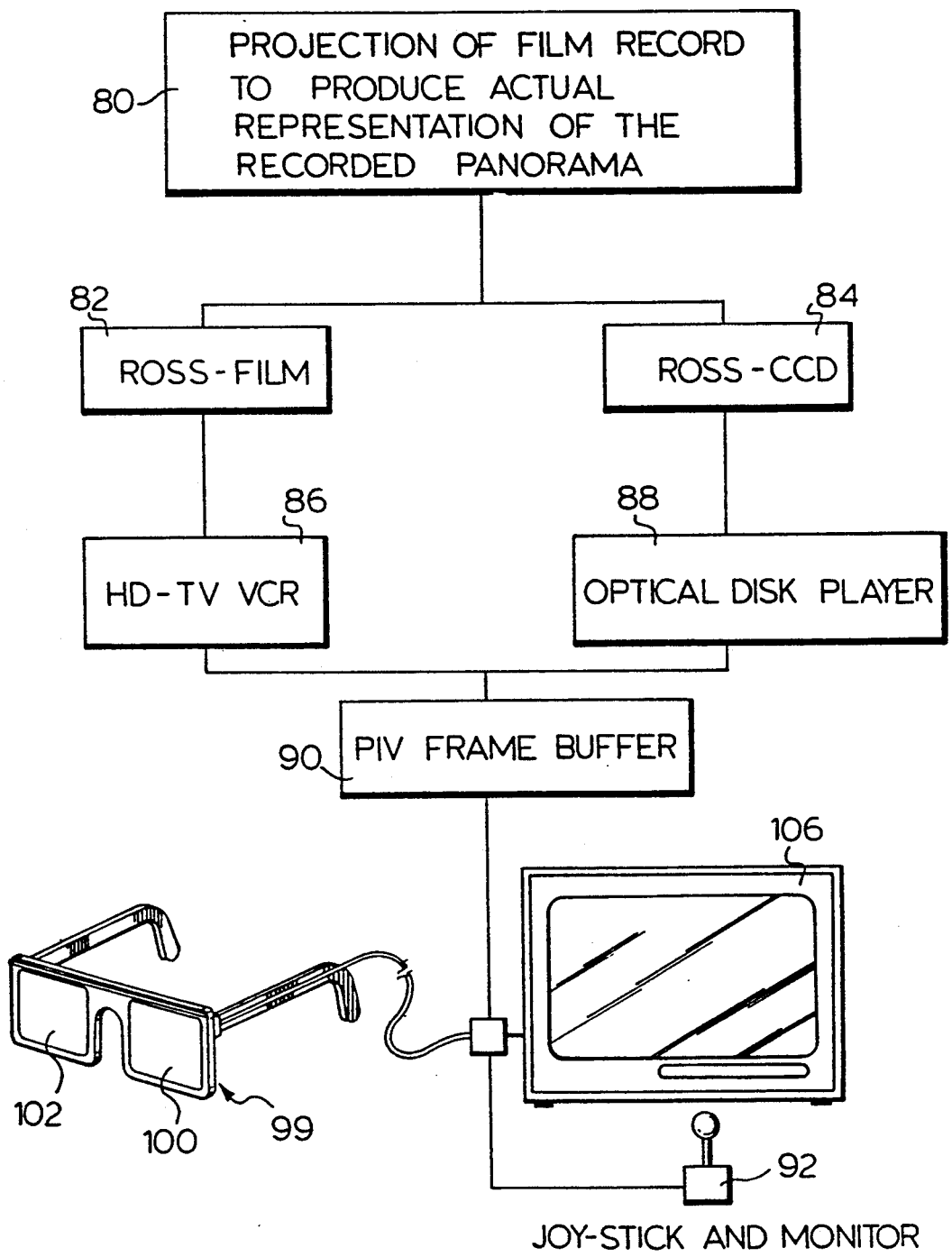

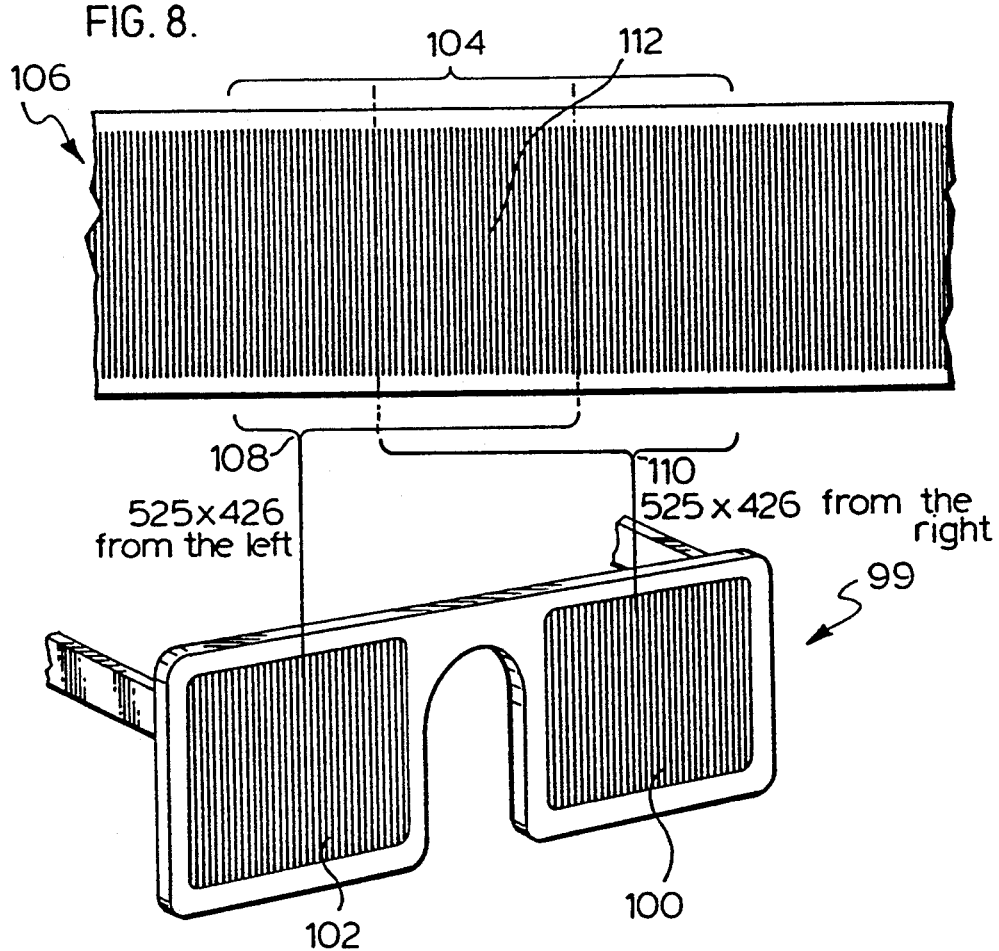
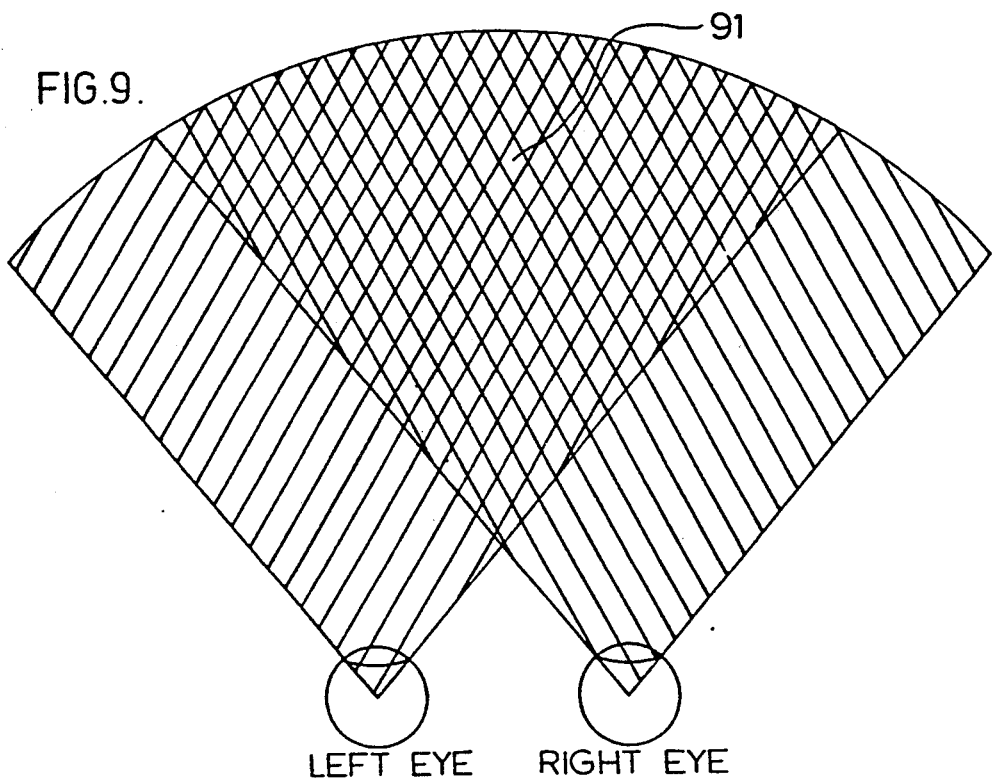

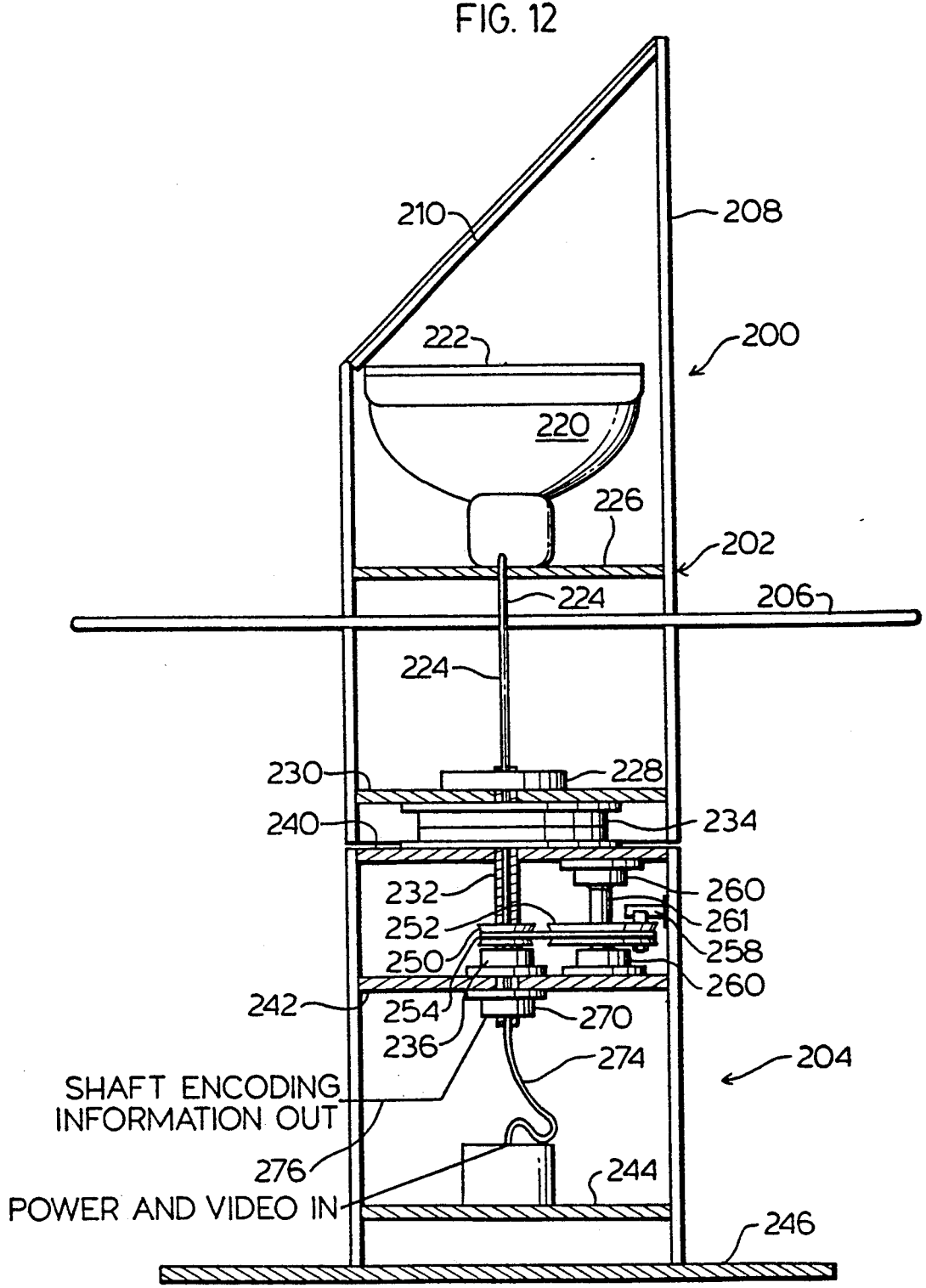

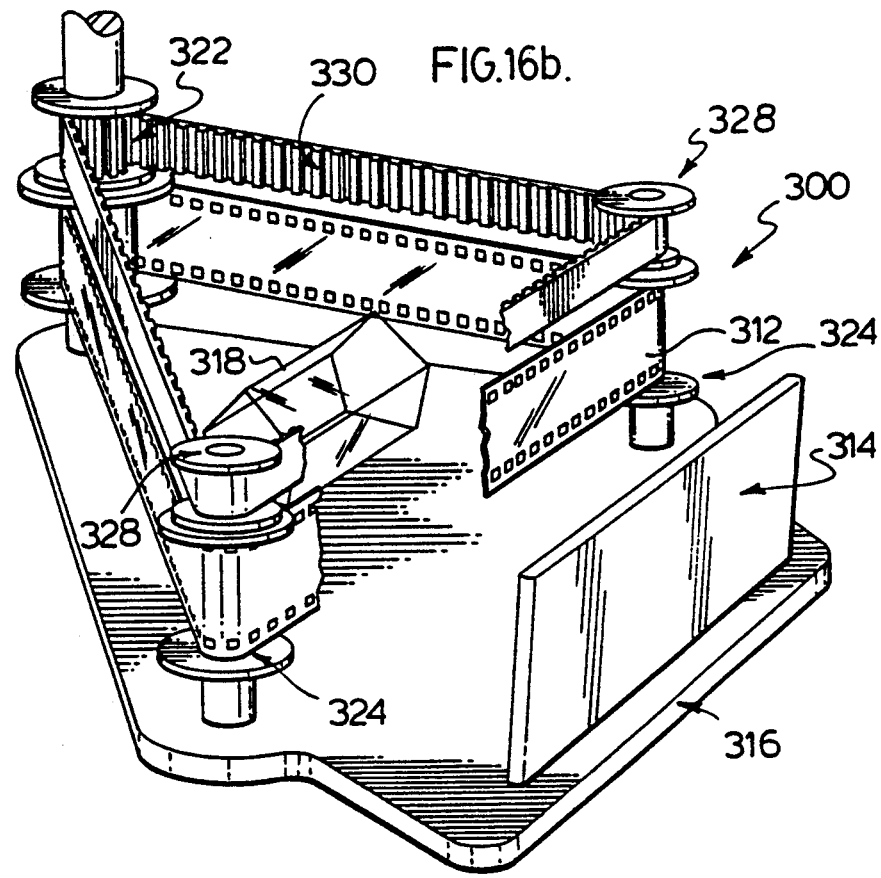
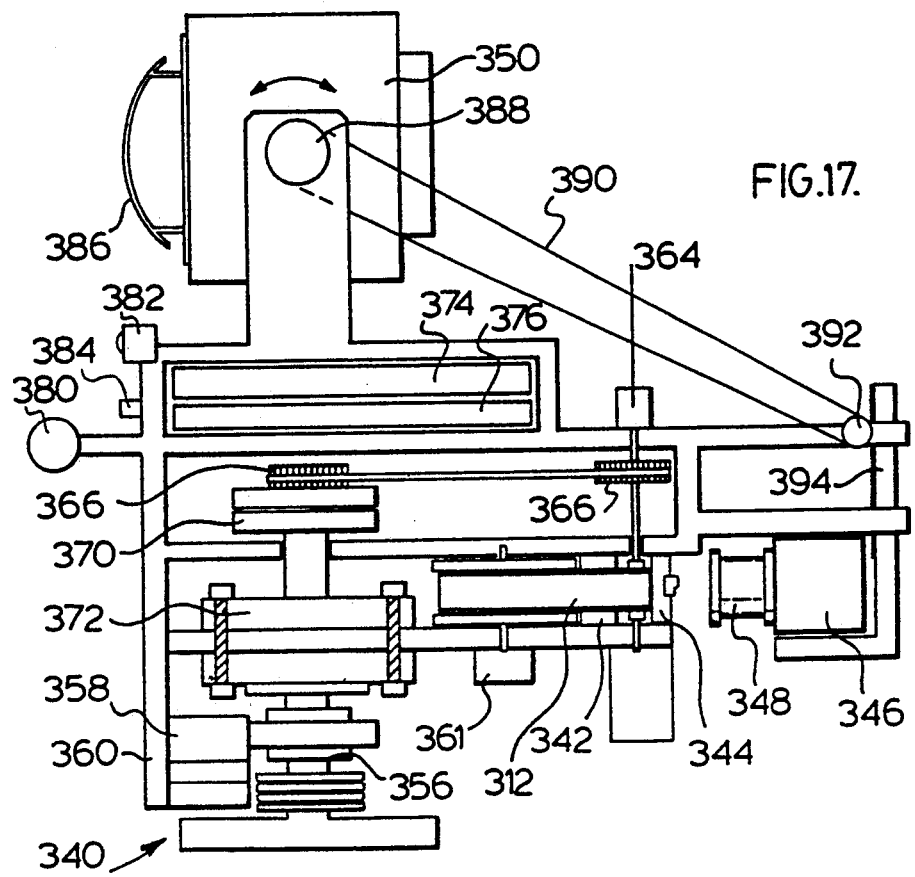

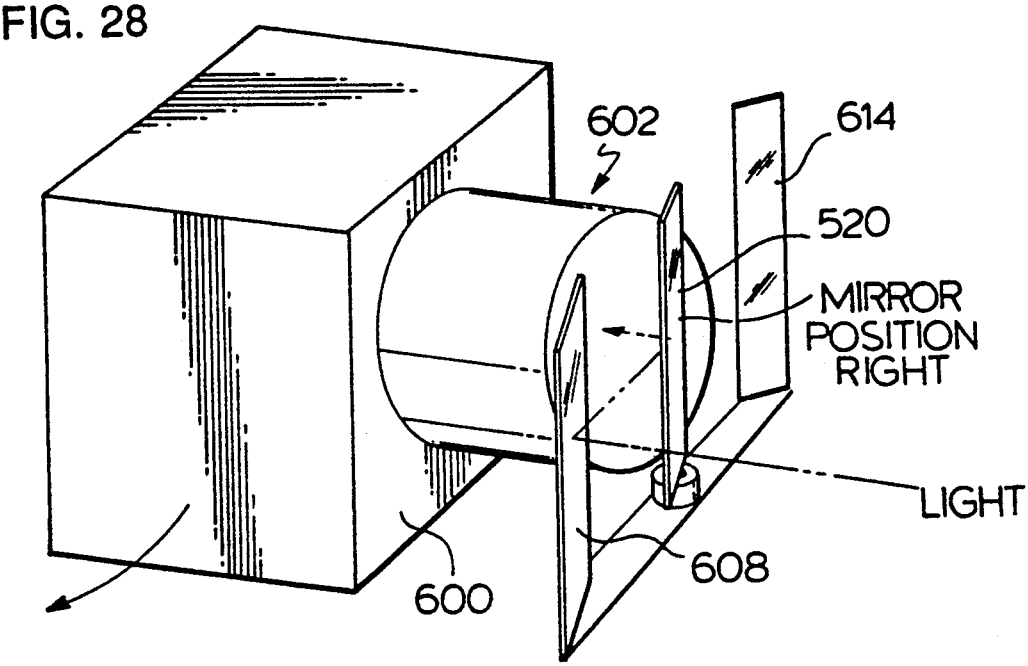
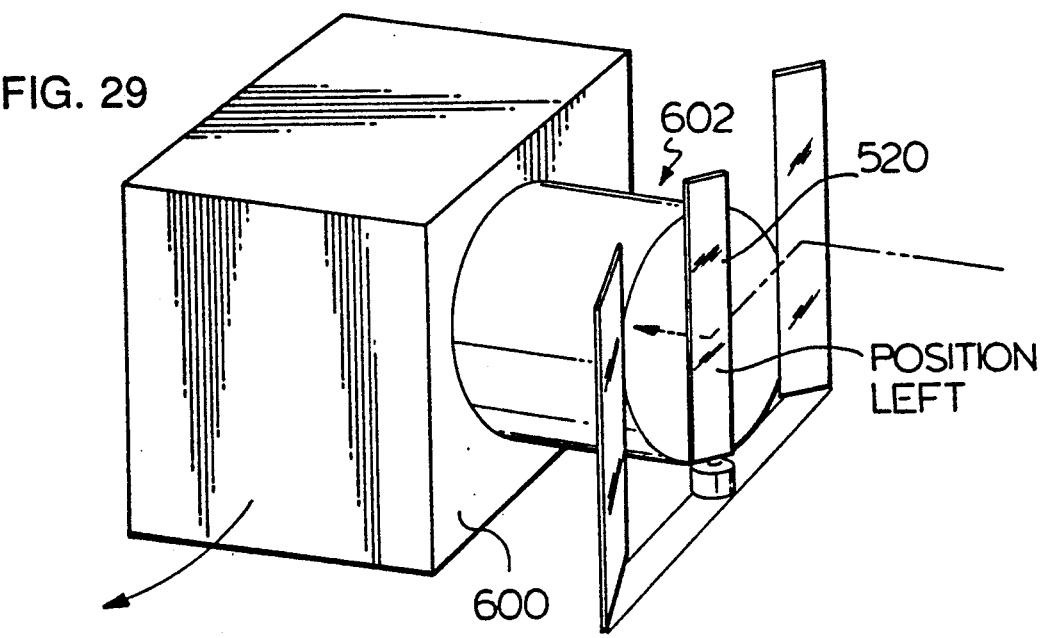

PANORAMIC INTERACTIVE SYSTEM INCLUDING COORDINATED MOVEMENT OF A FILM RECORD WITHIN A VIEWING HEAD

CROSS-REFERENCE TO RELATED APPLICATIONS

This application is a continuation-in-part of application Ser. No. 07/737,148 filed Jul. 29, 1991, now U.S. Pat. No. 5,153,716 which is a continuation-in-part of application Ser. No. 07/601,232 filed Oct. 22, 1990, now U.S. Pat. No. 5,040,055 which is a continuation-in-part of application Ser. No. 07/448,263 filed Dec. 11, 1989 now U.S. Pat. No. 4,185,766.

BACKGROUND OF THE INVENTION

Panoramic recording systems are known and have used moving imagers, fish-eye lenses, multiple cameras or panoramic lenses for recording of a panorama or a large portion thereof. Many of the known techniques are suitable for a still panorama, however, even in this case, changing light conditions or changes within the panorama can cause distortion and loss of accuracy.

The use of panoramic lenses or fish-eye lenses in recording of an image produce a distorted form of the image on a film record. The film record is basically a circular mapping of the panorama and are difficult to use in that formal. It is known to take these film records and project them on a cylindrical screen for viewing. In the case of real time panoramic imaging, recording of the image in this particular form does provide good detail, but viewing in the circular form is not particularly satisfactory.

One example of a different method for recording a generally static panoramic image is disclosed in U.S. Pat. No. 4,125,862 which issued Nov. 14, 1978. This patent discloses a system where the panorama is scanned in a series of discreet segments and the information is recorded in a format suitable for use in displaying of portions of that panorama on a video display unit. The time interval to effectively scan the entire panorama renders this type of direct recording of the panorama only useful for generally static panoramas or ones in which real time imaging is not critical. With such a system, changing light conditions may also cause portions of the panorama to be less visible.

U.S. Pat. No. 3,240,113, which issued to Stechemesser et al Mar. 15, 1966, discloses a particular image gathering arrangement which utilizes panoramic lenses and results in recording of the panorama on a film record in a ring type shape. This patent also illustrates how the recorded images can be reprojected and shown on a cylindrical screen.

There remains a need to provide a simple system for viewing of a panorama image stored in a suitable accessible record media.

There also remains a need to provide a system for the convenient and effective viewing of a real panorama image while providing the use with some of the physical sensations associated with normal scanning of an actual panorama.

SUMMARY OF THE INVENTION

The present invention is directed to a method and system which simplify viewing of panoramic images. The system receives and positions at least one film recorded panoramic image and includes optical means for viewing of a selected segment of the film recorded panoramic image. The optical viewing means is controlled by the user by controlled rotation of the system about a fixed support which in turn causes movement of the film of the segment of panorama viewed. With this structure the user must vary the rotational position of the system which in turn causes a movement of the film. This system ties the user to a system requiring a particular physical movement to change the segment of the panorama viewed making the viewing more realistic.

The present invention is also directed to a film record of at least one panorama image wherein the film record has the panorama image stored at least 3 times in a continuous sequence without interruption.

According to a further aspect of the invention the film record has a number of separate panorama images stored in tracks one above the other.

BRIEF DESCRIPTION OF THE DRAWINGS

Preferred embodiments of the invention are shown in the drawings, wherein:

FIG. 1 is a flow chart showing the recording of a still panorama;

FIG. 2 is a flow chart showing the recording of a real time panorama;

FIG. 3 is a schematic illustrating various types of panoramic lenses referred to as P-lenses, type A and type B;

FIG. 6 shows the preferred rectangular panorama record produced by the apparatus of FIG. 5;

FIG. 7 is a schematic illustrating the projection of the film record of the first stage of the invention and the subsequent recording thereof and eventual display on a video display device;

FIG. 8 is a schematic of a portion of a rectangular panoramic record being sampled for display on video glasses associated therewith;

FIG. 9 is a schematic of the field of view of two eyes;

FIG. 12 is a vertical section of a video display viewing arrangement;

FIGS. 16a and 16b are cutaway views of the periscope viewer;

FIG. 17 is a sectional view of an automated viewing arrangement;

FIGS. 28 and 29 show a further modification of a slit scan camera for recording of stereoscopic images;

DETAILED DESCRIPTION OF THE PREFERRED EMBODIMENTS

The method and apparatus initially described convert a still panorama into a conventional rectangular panorama record suitable for use in selective display on a video display devise. Such a conventional rectangular panorama record is known, as exemplified by the U.S. Pat. No. 4,125,862. Such an arrangement has a user control which allows the the user to select what portion of the rectangular panorama record that he wishes to nave displayed on the video display device and for simulating moving within the panorama by adjusting the controls.

Figure 4:
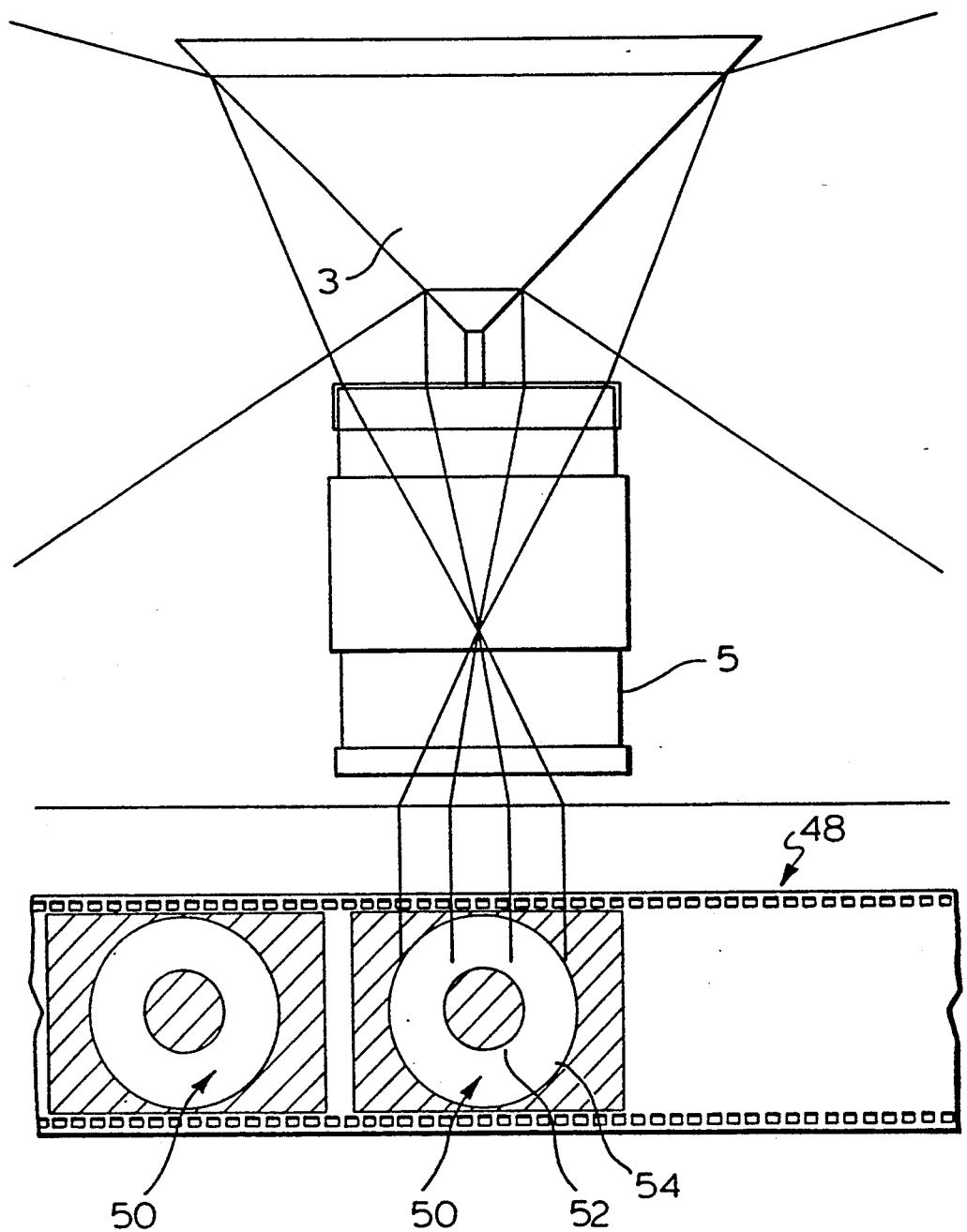
FIG. 4 is a schematic illustrating the recording of a panorama using a P-lens to produce the ring shape initial film record.
Figure 5:
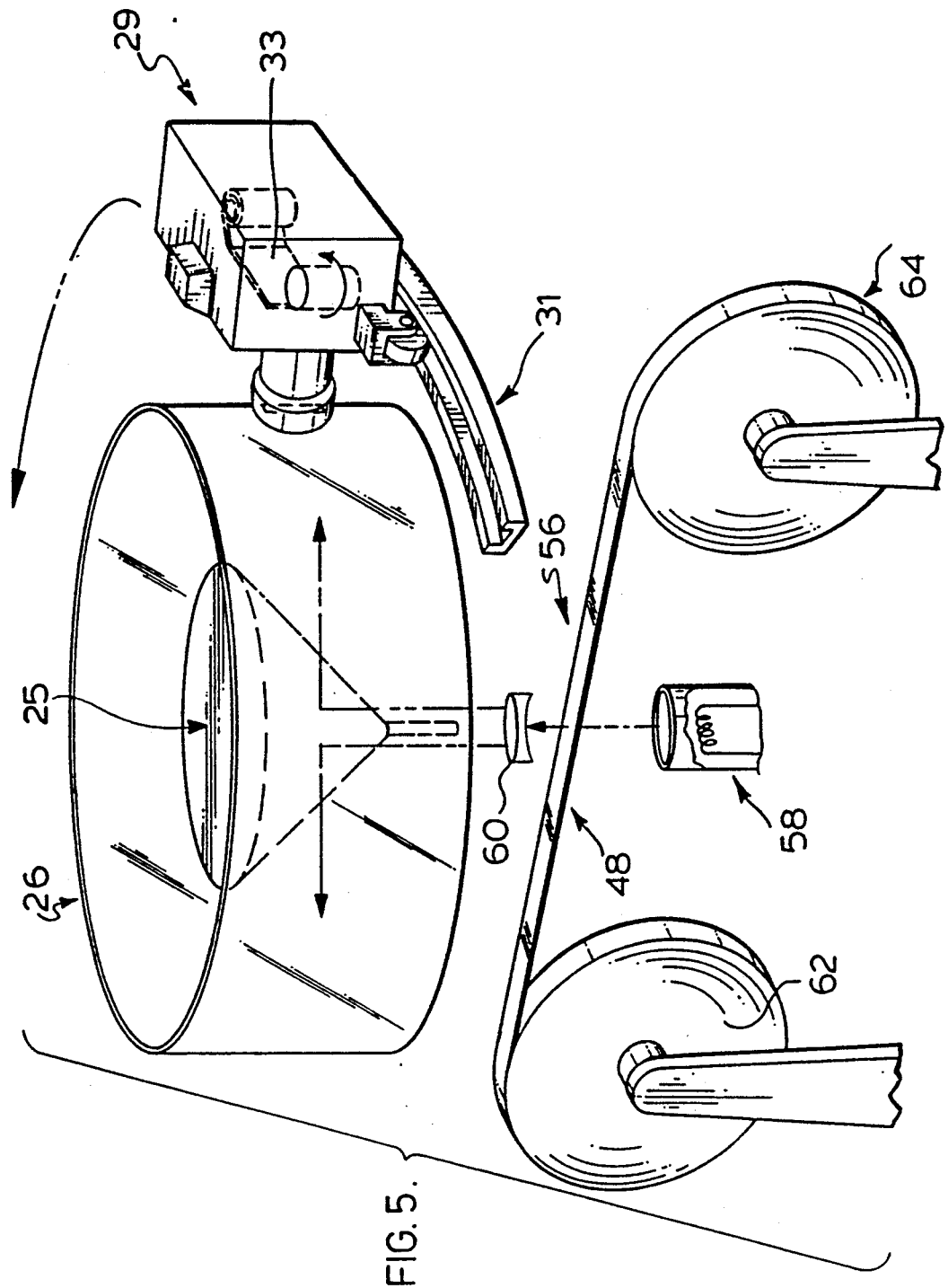
FIG. 5 is a partial perspective showing the projection of the film record of FIG. 4 and the subsequent recording of the projected record by means of a Ross.
Figure 10:
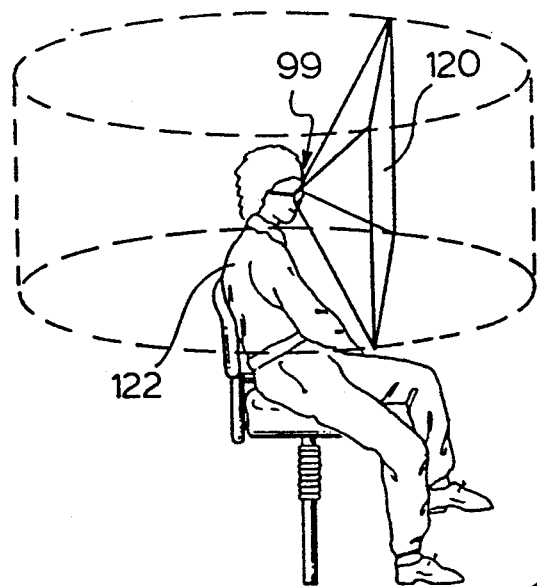
FIG. 10 is a representation of a viewer's field of view.
Figure 10A:
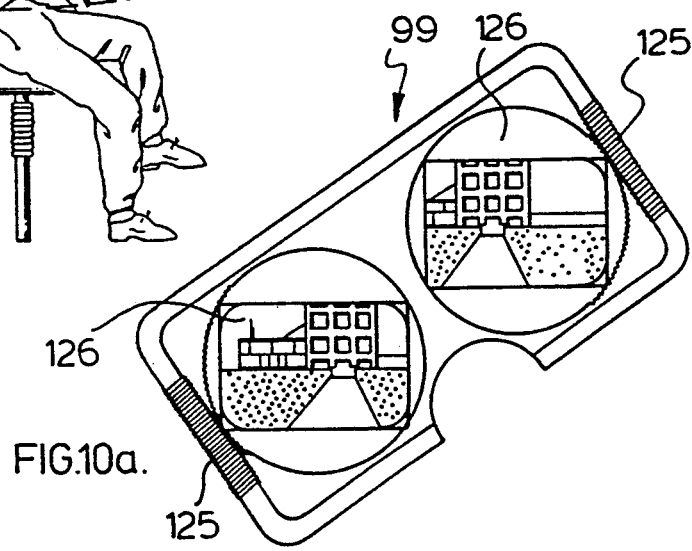
FIG. 10a, 10b and 10c show certain displays on the screens of video glasses.
Figure 10B:
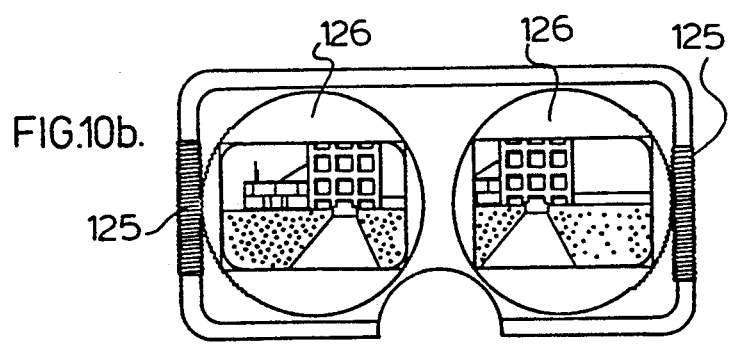
Figure 10C:
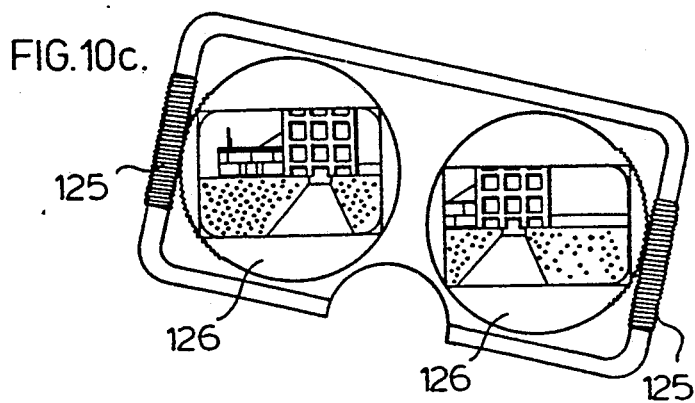
Figure 11:
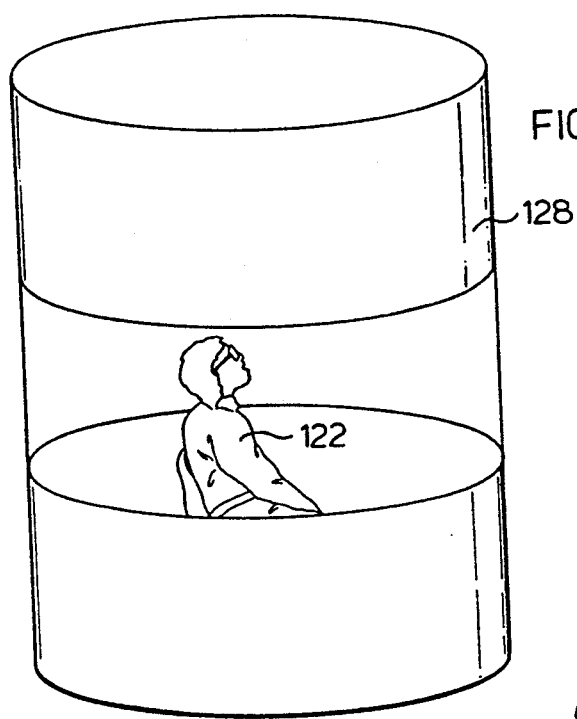
FIG. 11 is a representation of various fields of view of a user.
Figure 11A:
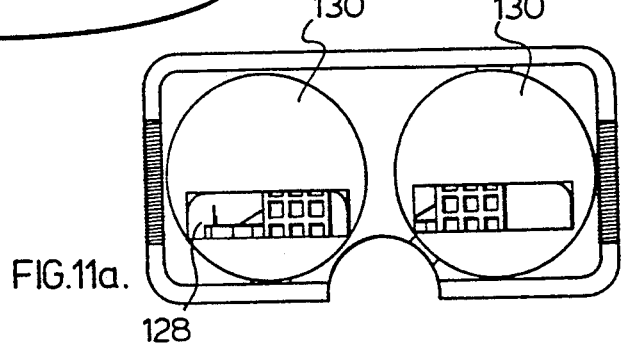
FIGS. 11a, 11b and 11c show certain displays on the screens of the video glasses under different actions of the user.
Figure 11B:
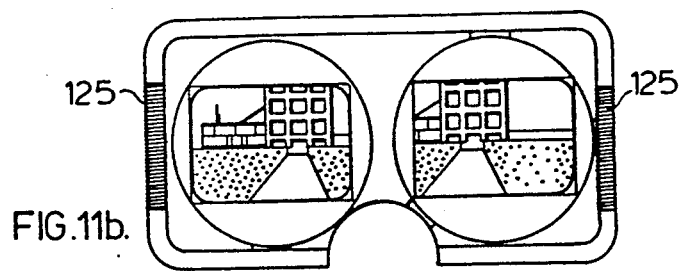
Figure 11C:
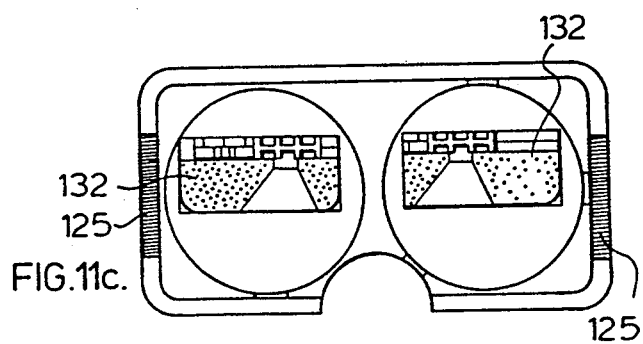
Figure 13:
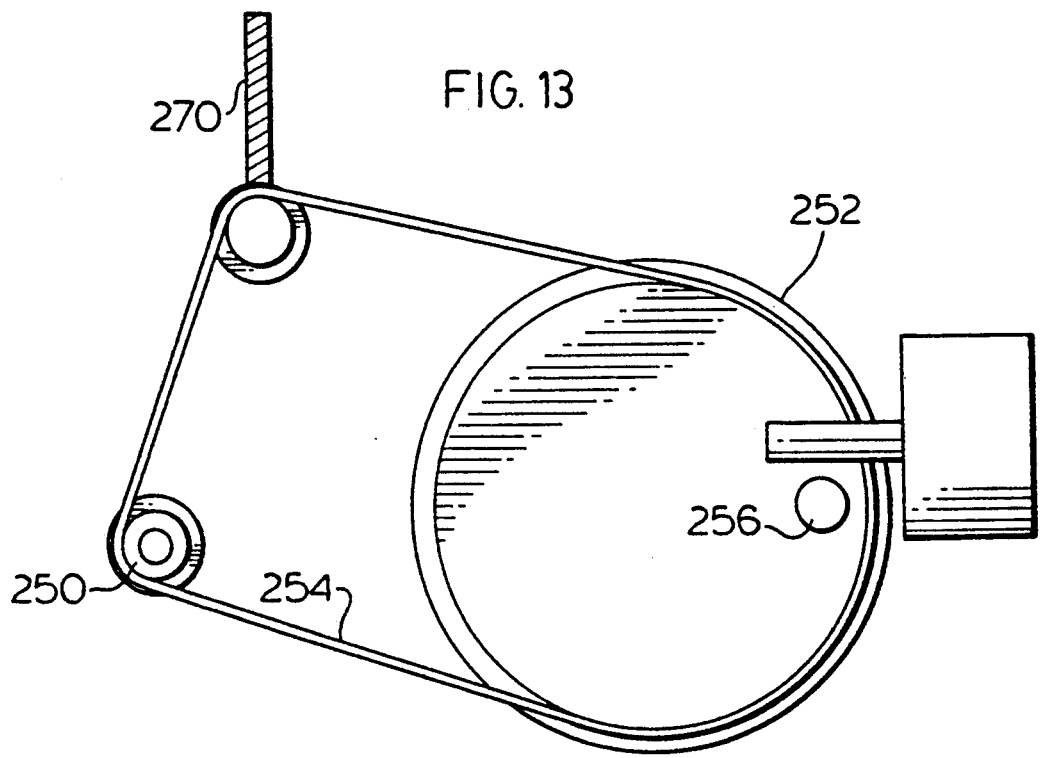
FIG. 13 is a top view of the pulley arrangement illustrating the various components associated with the rotatable sections of the viewing arrangement.

The first step 2 of the method illustrated in FIG. 1 requires recording of the panorama in a distorted from preferably as a ring or portion thereof on a film record, resulting in a circular mapping. This recording is accomplished, for example, by using a P-lens 3 and a conventional camera arrangement 5 to produce a record 50 as generally shown at the bottom of FIG. 4. Each one of the ring shaped images 50 would represent the panorama at a single point in time or corresponds to a still panorama. Each record 50 provides a distorted recording of the panorama and is generally difficult to directly use by individuals or effectively use by means of a video display FIGS. 12 and 13 show details of a panoramic viewing arrangement 200 having a rotating top cylindrical section 202 pivotally supported by a base cylindrical section 204. A hand rail 206 is secured to the rotating top section to allow a user to rotate the top section about a vertical axis of the base section 204. The panoramic viewing arrangement 200 includes a viewing area 208 which is observed by a viewer. The viewing area is a result of the image being projected from the video display tube 220 which is reflected off the mirror 210 to present the image at the viewing area 208. This type of arrangement uses folded optic techniques to space the viewer from the video display screen 222 of the video display tube 220.

The video display tube 220 is supported by support 226 provided in the rotating top section 202, and the power and video in cable 224 extends through this support surface 226. The power and video in cable 224 passes through the shaft fastener 228 and enters the hollow shaft 232 which passes out of the bottom of the top section 208 and extends into the stationary base section 204. The hollow shaft 232 passes through the bottom support 230 of the rotating top section 202 and the shaft fastener 228 is secured to this bottom support 230. With this arrangement, the hollow shaft 232 rotates with rotation of the top section 202.

A large bearing arrangement 234 is provided at the bottom of the top section 202 and the upper part of the base section 204 to secure the two sections and to allow rotation of the top section relative to the base section. Bearing 234 is supported on horizontal support 240 of the base section 204. The base section 204 also includes intermediate support 242, lower support 244, and a base member 246 which extends beyond the sidewalls of the base section. This enlarged base member provides additional stability for the panoramic viewing arrangement 200.

An optical shaft encoder 260 is provided at the base of the hollow shaft 232 and accurately determines the amount of rotation of the hollow shaft 232, and thus the amount of rotation of the rotating top section 202 relative to the base section 204. The signal from the optical shaft encoder is then processed and used for varying the segment of a stored panoramic image whereby the amount of movement of the top section results in the appropriate change in the portion of the panoramic image viewed. Thus, if a 360° panorama is stored in a buffer and the video display unit 220 displays approximately a 90° segment. The 90° segment of the panoramic image that is displayed, is determined by the optical shaft encoder to preferably correspond to the direction of the rotating top section 202. Thus, when the rotating top section is generally facing north, the portion of the panoramic image that faces north is displayed. Similarly, if the unit is facing west, the west portion of the panoramic image is viewed. In this way, a person seeking to view the entire panoramic image must rotate the top section 202 by means of the handle 206 and physically move his own body to view the new panorama. This matching of the person's body movement to a preferably equal corresponding movement in the selected portion of the panorama viewed, provides sensory feedback to the user similar to what would actually occur if the user was viewing the actual panorama, as this approach forces the user to move thereby changing the the points of reference about him as the points of reference change in the viewed panorama. Thus, the device forces the user to go through a physical movement corresponding to the type of physical movement that would normally be encountered to achieve that result. A person's fast movement results in a fast movement of the selected segment and some blurring which also corresponds with what would happen in real life should a person quickly change their direction. They do not have a continuous focus, but rather a blurred focus until they stop and refocus at the desired location. This effect also occurs with the present system.

The present system is preferably designed to have a one to one correspondence with movement of the person through a certain angle relative to the movement of the panorama through a certain angle. Although this is desired, it is certainly not limited to this and there may be certain applications where it would be advantageous to have a different correspondency rather than one to one. Any linked movement controlled by the user is within the scope of the present invention.

The panoramic viewing arrangement, as shown in FIG. 12, results in a coordination of the user or an interaction of the user with the apparatus to cause the user to go through certain physical movements which generally correspond to movements that he would actually have to carry out for viewing of the actual panorama corresponding to the image stored in the buffer. The panoramic viewing arrangement when rotated causes a different portion of the panorama to be displayed by the video display tube 220.

Rotation of the top section 202 relative to the base section 204 causes some problems with respect to the power and video in cable 224. This assumes that the memory buffer arrangement and the computer for selective viewing of the buffer arrangement is exterior to the top section 202. In order to allow rotation of the top section 202, excess cable 274 is provided in the base section 204. This excess cable allows for a large amount of rotation of the top section 202 relative to the base before any damage to this cable could occur. The cable between the optical shaft encoder and the top section merely rotates with the top section and thus, all wrapping of the cable occurs in the lower portion of the base section 204. The shaft encoder outputs to the computer (not shown) via cable 276. The signal from the optical shaft encoder is processed to provide the necessary adjustment of the segment of the stored panorama viewed. This is explained with respect to U the earlier drawings.

The panoramic viewing arrangement 200 does include an arrangement for limiting the extent that the top section 202 may be rotated relative to the base portion 204 to avoid overwinding of the power and video in cable 224. This limiting arrangement is partially defined by the small pulley wheel 250 secured to the hollow shaft 232 in combination with the large pulley wheel 252 offset from the hollow shaft 232. The large pulley wheel 252 is supported by means of a shaft 261 vertically supported by means of bearings 260. Pulley wheels 250 and 252 are connected via the pulley belt 254.

As can be seen in FIG. 13, a tension idler pulley 270 is provided which merely serves to appropriately tension the pulley belt 254 relative to the pulley wheels 250 and 252. Pulley wheel 250 is much smaller in circumference than the larger pulley wheel 252. There is an approximate 8 to 1 relationship between these wheel circumferences. Rotation of the hollow shaft 232 causes rotation of the small pulley wheel 250 and a corresponding rotation of the pulley wheel 252. Associated with pulley wheel 252 is a stop bolt 256 which is adapted to engage the fixed stop 258. When the stop bolt 256 is directly opposite the fixed stop 258, the power video in cable 274 is in a neutral position, or generally neutral position. Rotation of the top section 202 will cause the stop bolt to rotate relative to the fixed stop 258, and with sufficient rotation, will cause the stop bolt 256 to strike the fixed stop 258, as generally shown in FIG. 13. Further rotation of the top section in this direction is opposed by the engagement of the stop bolt 256 and the fixed stop 258. Some rotation can occur only as a result of slippage of the belt 254 on the large pulley wheel 252. Thus, some slippage is accommodated in the stop position, however the user will quickly recognize that there is some binding going on and will rotate the device in the opposite direction. Sufficient rotation of the top section 202 in the opposite direction will result in the stop bolt 256 striking the opposite side of the fixed stop 258 and a similar lock up will occur. Thus, this pulley arrangement provides a very simple means for limiting the amount of tension or stress than can be placed on the power and video in cable 224 to avoid any damage thereof.

Rotational couplings could also be used to avoid this winding of cables, however such couplings are not generally used with respect to video cables. If such a coupling was used, there would be no need to provide the stop arrangement as described with respect to FIG. 13.

The device has been described with respect to an optical shaft encoder for sensing rotational movement of the rotatable top section relative to the base section and producing a proportional signal for varying the viewed segment of the stored panoramic image. It can be appreciated that other devices for tracking this rotational and varying the image viewed can be used.

A further approach with respect to the unit, as shown in FIG. 12, is incorporating the computer and frame buffer in the rotating section 202 whereby only the power for driving these components need be connected to a rotating coupling. Rotating couplings for power components are certainly much more widely used and readily available. Thus, by providing the computer and frame buffer within the rotating top section 202, the stop arrangement would not be required.

With the stand as generally shown in FIG. 12, one computer can process the signals received from several shaft encoding devices of separate panoramic viewing arrangements 200 and thus, the cost for such multiple units would be less, as the computer could be shared by several such units.

The use of the panoramic viewing arrangement of FIG. 12 has been described with respect to a single user however it is apparent this arrangement can be shared by two or more people with all users experiencing the same interaction with the changing reference points of the users as the reference points in the viewed panoramic image change. Thus shared viewing is possible at no additional cost which introduces the benefits of user interaction in viewing the stored image or images.

Although the panoramic viewing arrangement has been described with respect to the structure as generally shown in FIG. 12, a lower cost arrangement is possible where the rotating top section generally stops at support 226 which forms the upper surface of the rotating top section. The user then connects a separate video display terminal to the viewing arrangement to provide a similar structure. This modified arrangement is certainly less expensive than the dedicated type unit shown with respect to FIG. 12.

In some applications, the video display arrangement shown in FIG. 12 can be modified to provide, for example, four separate viewing areas within the rotating top section 202. This might be particularly advantageous at tourist sites where various users could be located about the unit. All units would be rotated simultaneously or with the rotating top section 202 and the segment of the panoramic viewed by each unit would be appropriately adjusted. Thus, although the panoramic viewing arrangement 200 shows one video display unit suitable for generally one user or users orientated in one direction, multiple units within the panoramic viewing arrangement are possible to allow multiple viewing, albeit these multiple viewings will be in different directions.

The modified rotatable control described with respect to FIG. 12 could support a image projecting arrangement whereby the projected image is captured on a screen about the rotatable control. Rotation of the control varies the segment of the panoramic image projected.

It has been found, with the panoramic viewing arrangement of the present invention, that it is superior to static viewing situations such as joysticks, in that the user experiences normal body feedback sensations resulting from a change in viewing direction in combination with the change in the image displayed. Thus, the present invention links in an efficient and effective manner a person's normal body functions used to view a real panorama with a user changeable panoramic image. The structure causes the person to use similar body movements for viewing of the recorded panorama image as are required for viewing the actual panorama.

The preferred panoramic viewing arrangement of FIG. 12 or the modified structure as described with respect to FIG. 12 provides a simple cost effective mechanism which is extremely user friendly and allows the individual to easily use the device and quickly understand how the device works. This arrangement is considered particularly useful for any application where it is desirable to view panorama images and have a better feel for body response in association with this viewing. Applications will certainly be apparent to architects who are trying to convince clients with respect to a particular location or how this location impacts upon certain plans that they have, as well as other applications such as tourist applications, as but two examples.

The viewing arrangement as disclosed in FIGS. 12 and 13 provide a low cost alternative to the much higher cost alternative of video glasses.

Figure 14:
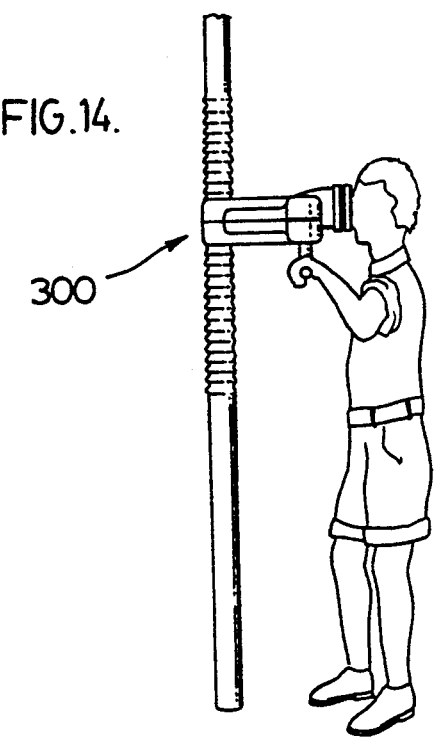
FIG. 14 is a perspective view of a periscope viewer.
Figure 15:
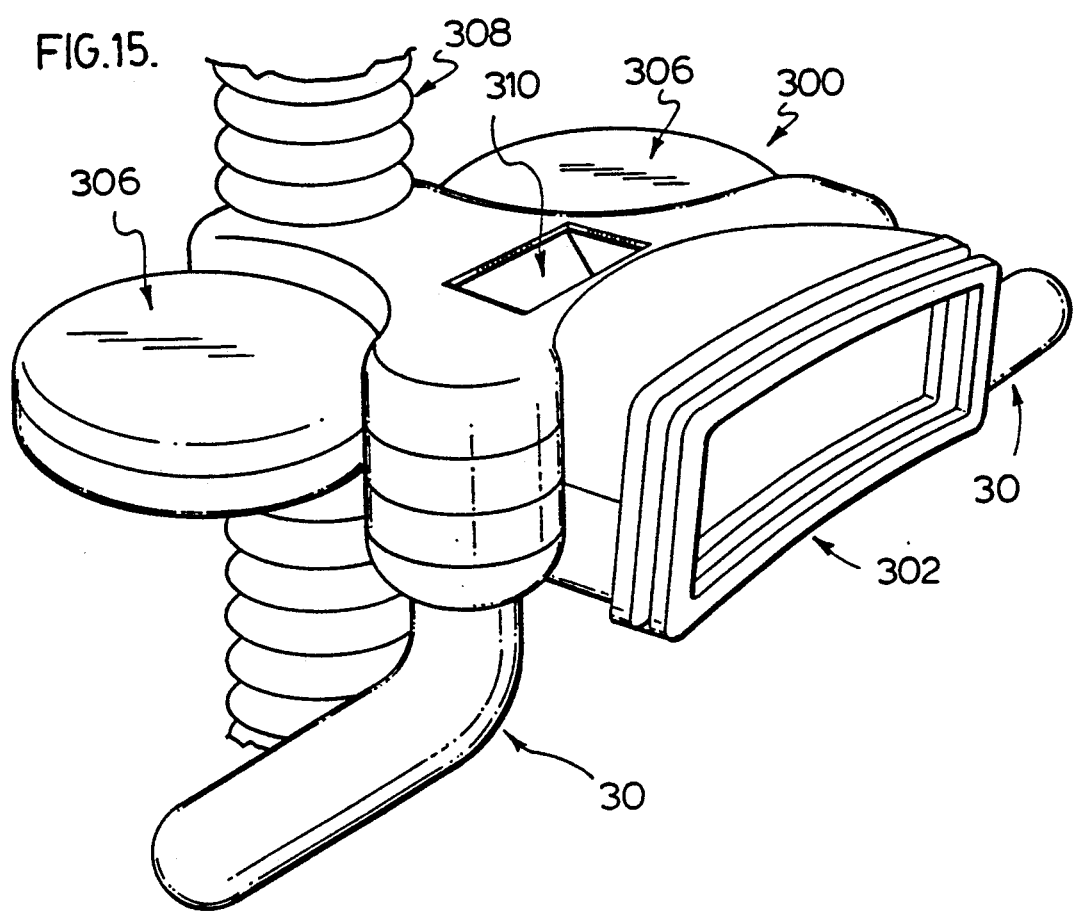
FIG. 15 is a perspective view of the periscope viewer.

As shown in FIGS. 14 through 16, a periscope style viewer 300 cooperates with and is secured by a post or other fixed type structure with the viewer rotatable thereabout. As shown in FIG. 15, the periscope style viewer 300 includes a viewing and lens arrangement 302, control handles 304, reel film housings 306, all supported by the support post 308. The viewer also includes a light emitting port generally shown as 310 behind the film or a light source behind the film to improve the projected image on the film.

Figure 16A:
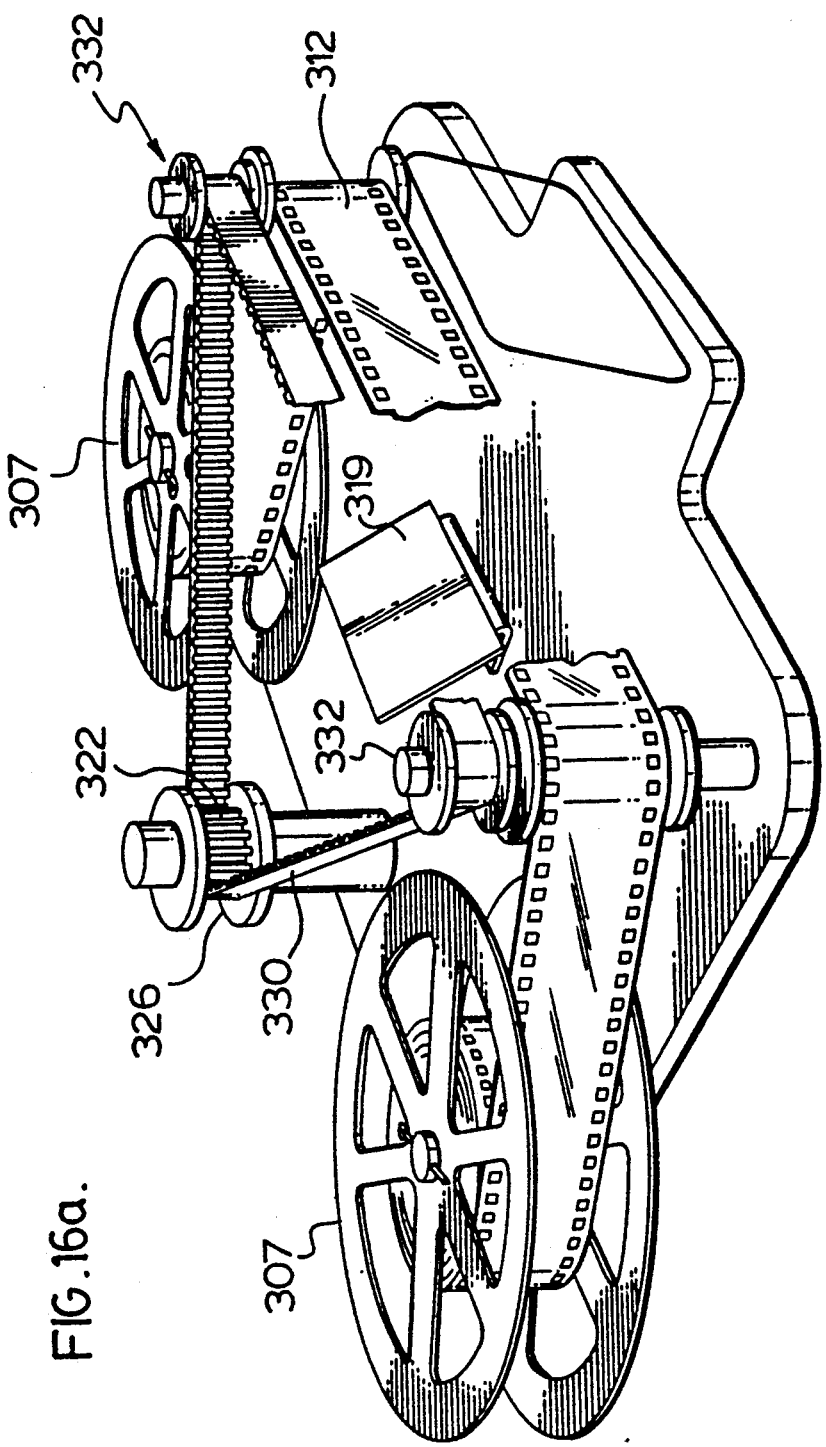
Figure 18A:
FIGS. 18a through FIG. 18h illustrate the film record and the cooperation with the portion of the file record being viewed.
Figure 18B:
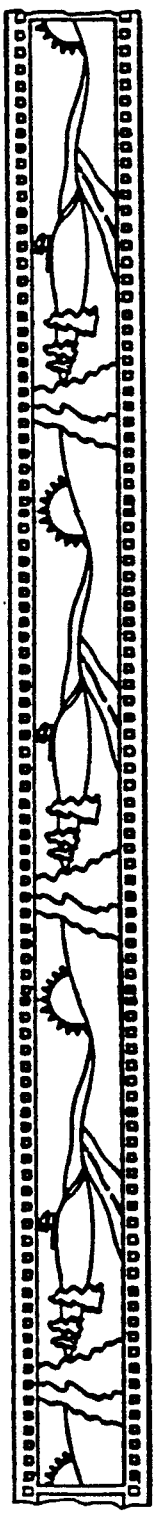
Figure 18C:
Figure 18D:
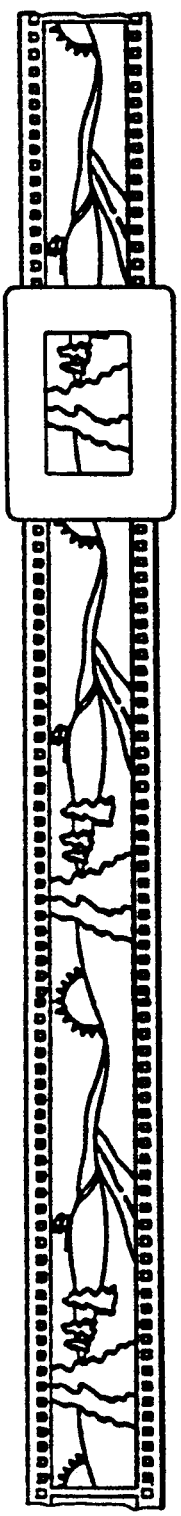
Figure 18E:
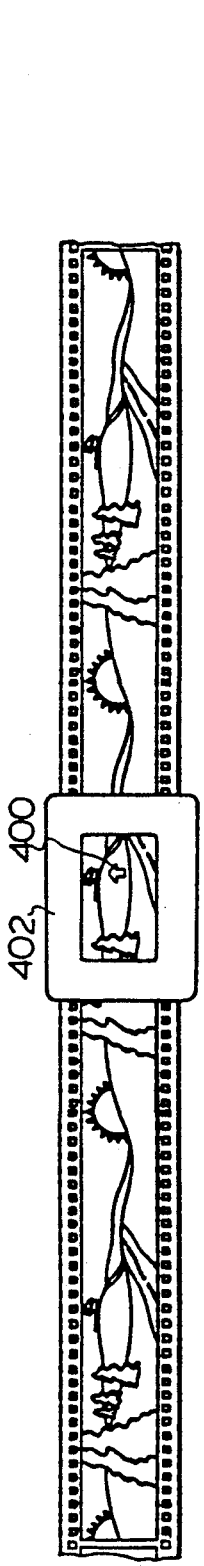
Figure 18F:
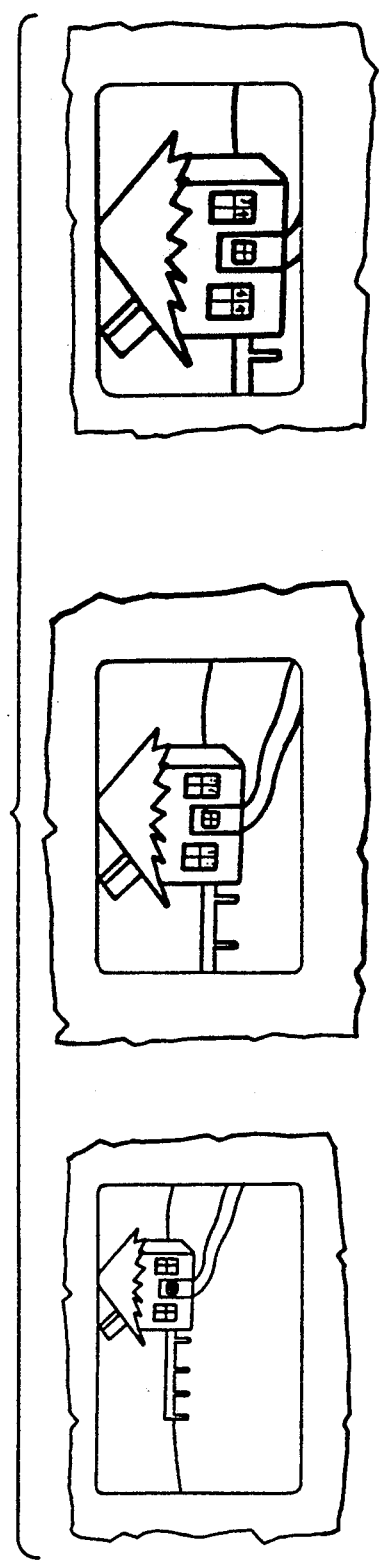
Figure 18G:
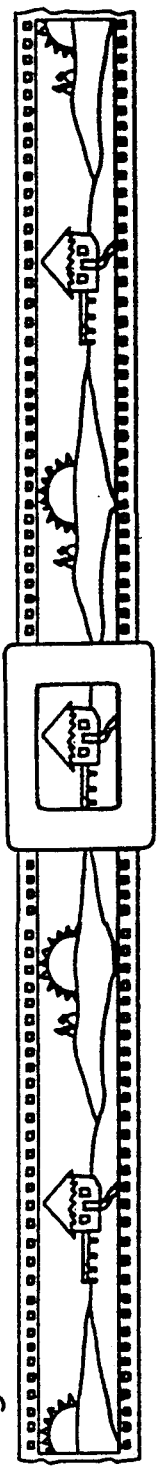
Figure 18H:
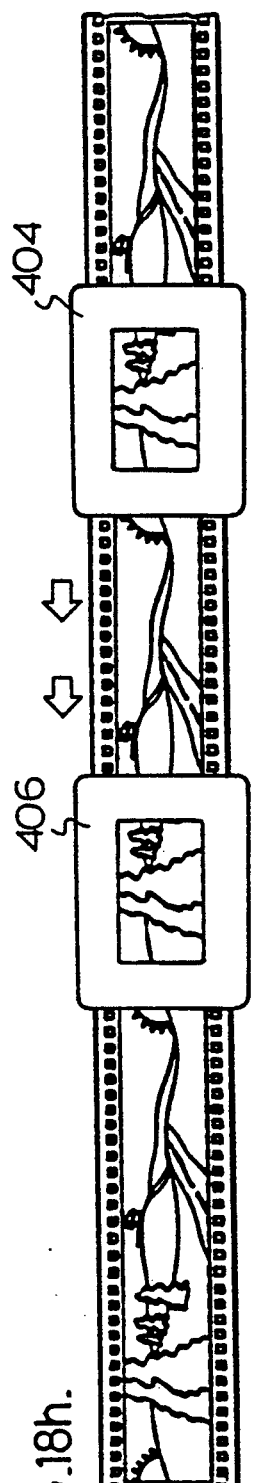
Figure 19:
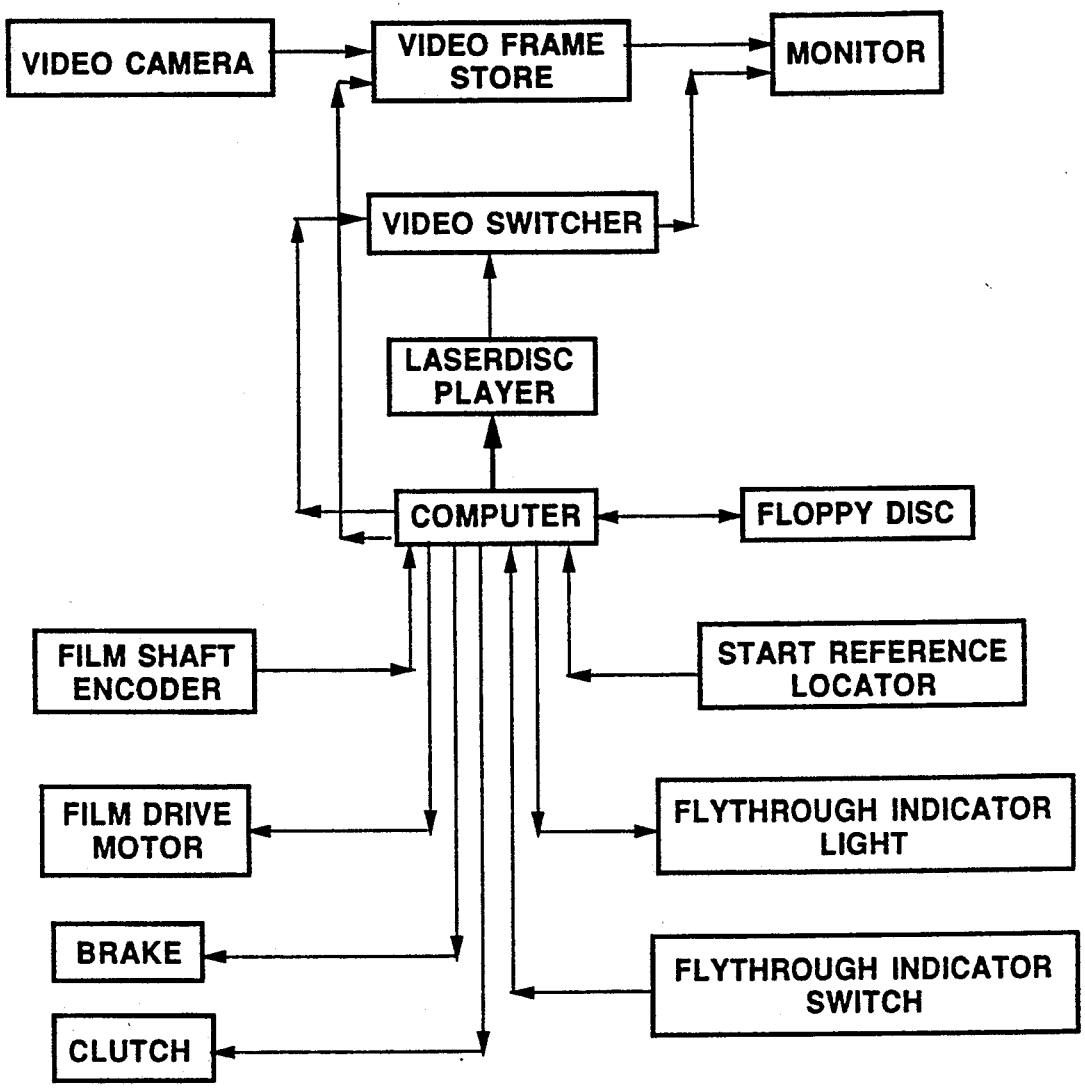
FIG. 19 is a schematic showing the various cooperation of components of the automated viewer of FIG. 17.

Details of the viewer can be seen in FIG. 16A. In this case a panorama type image is recorded on the film 312 and in the preferred form of the invention the panorama will be recorded as a continuous panorama a number of times along the length of this film. The film is driven and eventually collected by one of the reel spools 307. The viewer is rotatable about the support post 308 by the user and this in turn causes rotation of the film in the embodiment shown in FIGS. 16A and 16B.

The post includes a stationary cog 322 which engages the drive belt 330. As the viewer is rotated about the post 320, a sympathetic movement of the belt 330 occurs causing rotation of the drive cogs 328. These drive cogs each have a connected drive spool 332 for driving the film by means of teeth engaging the perforations in the film. In the embodiment of FIG. 16B the film 312 is of a continuous loop and a suitable gearing arrangement is provided so that angular movement within the panorama image directly corresponds with movement of the actual viewer so that the person viewing has a one to one relationship. For a given angle of movement of the viewer a similar angle of movement in the panorama occurs.

Light can be provided behind the film to improve the visibility of the panorama on the film 312 or it can be introduced from above and deflected to the back of the film by the prism arrangement 318 of FIG. 16B or the mirror arrangement 319 of FIG. 16A.

In either of the arrangement of 16A or 16B the rotation of the viewer about the stationary post causes a corresponding movement of the film. With this arrangement, the user's kinematics in viewing are coordinated with the resulting motion illustrated due to varying of the segment of the panorama being viewed. In this way, the user has a more realistic viewing of the panorama as it has been tied to his physical movement or at least the movement of the viewer. The viewers of FIG. 16A and 16B are of a simple nature and could be used in museums or other public places to provide instruction, orientation or just information all related to panoramic views. This type of arrangement could be used for other than panoramic viewing, however, it is particularly useful for this application.

The belt 330 is shown as straight but would be twisted to provide the desired rotation of the drive spools with rotation of the viewer about the stationary drive cog. A further cog could mesh with cog 322 and drive the belt if the belt is not twisted.

In FIG. 17 a more sophisticated viewing system is shown. The viewing system 340 again includes a film record 312 having a light source 342 placed between the film and a viewing port generally shown as 344. To the opposite side of the film is a video camera generally shown as 346 with the lens 348 of the camera directed at the projection of the film visible through the viewing port 344. The lens 348 is a zoom lens and, in the widest angle of the lens, is able to view the entire film and by using the zoom feature can focus in on a narrower track of the film. The output of the video camera 346 is sent to the video display monitor 350 thus whatever the video camera is seeing on the projected film is transmitted to the video display monitor 350. The film is driven by a twisted belt 368 which in turn is driven due to rotational movement of the system about the base 354. It can be seen that the entire arrangement is rotatable about the central shaft 356 of the base. A brake arrangement 358 limits the rate at which the system may be rotated about the shaft 356. This serves as a protection for the system and thus limits the rate at which the system can be rotated about the shaft. The brake is also used to lock the viewer in a position during movement of the film to a different panorama. The base also includes an electrical power coupling generally shown as 360 which allows power to be introduced through the base and transmitted to the system regardless of the rotational position of the system.

It can be seen that the drive motor 352 for the film 312 drives the film and is connected to a shaft encoder generally shown as 364. Tension is maintained on the film by the tensioning arrangement 361. The shaft encoder maintains information as to the film position. The drive motor 352 allows the film to be advanced independently of the rotation of the housing by means of the clutch 370 separating the advancement of the film from the central shaft 356. When clutch 370 is selectively disengaged to advance the film independently of the rotation of the viewer, brake 358 is actuated whereby the housing can not rotate. This occurs when the user decides to view a different panoramic image stored on the film, for example two or more panorama images can be stored in back to back relationship, and should the user choose to view a different panorama, the housing is basically locked and the film is then advanced by motor 352 to the appropriate place in the desired panorama which would be at some distance from the initial position. All of these positions are maintained by means of the shaft encoder 364 and the computer 376. Bearings 372 serve to rotatably support the housing about the shaft 356. Associated with this system is a laser disc player 374 and the computer 376. The laser disc player can play other recorded images which can be sent to the video display monitor 350. For example, when the user decides to move from one panoramic image to a different panoramic image, the laser disc player can play a recorded fly through, i.e. a film record of movement from the location of the panoramic image being viewed to the location of the chosen panoramic image, and this is sent to the monitor as the film is separately advanced to the chosen panoramic image or adjustments are made for viewing of the chosen panoramic image. The computer serves to coordinate the various tracks of the laser disc player relative to the desired fly through being indicated by the user. The user has panning handles 380, a fly through bottom indicator 382 and a zoom control 384.

The system also includes tilt handles 386 which allow the user to pan the panoramic image record in a vertical type pan. This is accomplished by tilting of the video display monitor 50 which causes a movement of the belt 390 connected to the fixed wheel 388 of the monitor thus tilting movement causes movement of the wheel 388 and movement of the belt 390. This in turn causes a sympathetic movement of the wheel 392 which forms a rack and pinion type arrangement with the rack 394 which in turn raises or lowers the position of the video camera. This vertical movement of the video camera will result in a movement of the lens vertically on the film which will be illustrated on the monitor as a upward tilting similar to what the person would do in real life by moving his head to look upwardly. Similarly a downward movement of the users head is mimicked by a lowering of the video camera.

The film 312 can be recorded by a slit scan camera and can have very high precision. This precision is much higher than that of a digital signal now used to produce images on a television even if the signal would be a high density television signal. This excellent detail in the film record is advantageously used to allow effective zooming of a portion of the record by controlling the zoom lens 348.

FIG. 17A shows a schematic of the various components of the viewing system 340. The video camera has associated therewith a video frame store which is connected to the monitor. The computer controls the laser disc which in turn controls the video switcher whereby a signal from the laser disc can be sent through the video switcher to the monitor. This would be the case when a fly through is desired. Further explanation of the fly through will be provided with respect to FIGS. 18. The film shaft encoder continually sends information to the computer to accurately locate the film or the position of the viewing film in the system and in turn provides information as to the position of the viewer. This is important when it is desired to keep the direction of the viewer in synchronization with the direction being viewed. The computer is also used to control the film drive motor, the brake arrangement and the clutch. The flythrough indicator switch is also connected as an input to the computer. The purpose of the computer is to control the interaction of the laser disc, the video camera, the drive motor and the brake.

FIG. 18 shows a single panoramic image on a film record. In FIG. 18B the single panoramic image has been reproduced three times in a continuous manner to provide a film record that is particularly useful with the viewers of the present system. In FIG. 18C the display window or the window seen by the video camera of the user is superimposed over the film record. It can be seen that this display window is generally centrally provided in the panorama. In FIG. 18D the user has caused some rotation of the system and has moved along the panorama image and in fact has returned to a position very close to his initial position. This would represent a rotation of about 330° as can be seen if he would move a little further with the same direction of rotation he would return to the initial seen shown in the view of FIG. 18C but in this case would be off to the right in the third panorama. FIG. 18E shows the same panorama but in this case includes arrow 400 which indicates that there is a further panorama associated with the small house generally shown as 402 on the film record. If the person so chooses, they could actuate the fly through button if they are operating the system of FIG. 17A and record a fly through to that house followed by a separate viewing of a panorama associated with the house 402. The various stages of FIG. 18F illustrate the zoom capability which is particularly effective due to the excellent detail in the film whereby even at a high zoom level the resulting image is more than satisfactory. Upon completion of the fly through the film has been advanced by the motor to a new panorama associated with the house 402. Thus during the fly through the film has been advanced to appropriate location for the panorama associated with the house. The user then returns to his normal panning operation of the panorama associated with that as indicated in 18G. FIG. 18H shows one aspect of the system. If the user is at the location generally located by the viewing screen 404 in FIG. 18H, the system can return to a more central location indicated by the viewing screen 406. In this case the computer sends to the video display monitor the latest video frame that is stored in the video frame store shown in FIG. 17B and then controls the drive motor to return to a position in the panorama indicated by the viewing screen 406. In this way the system can control the location of the film and thus serve to manage the viewing such that the viewer cannot get to the ends of the panorama film record as he is continuously being brought back to the central panorama of the three identical panorama that have been produced and recorded on the film.

Figure 20:
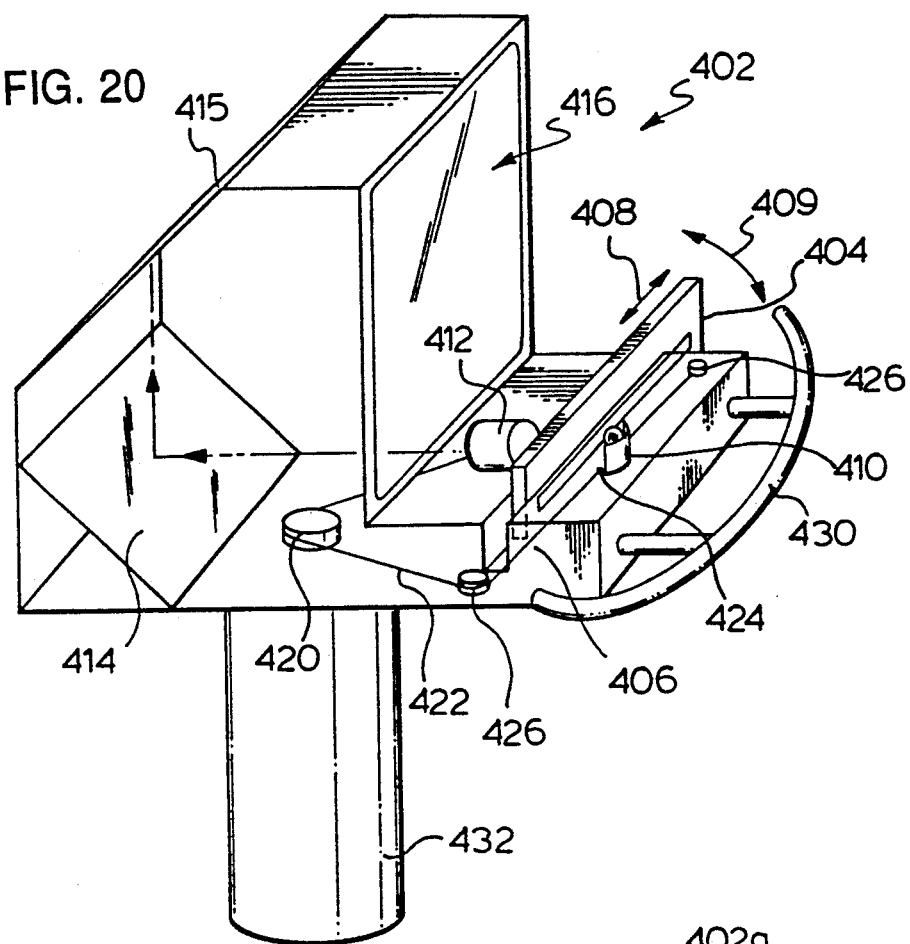
FIG. 20 is a perspective view of a slide panoramic viewer.

The panoramic viewer, generally shown as 402 in FIG. 20, has a panoramic record receiving slide 404 which cooperates with the slide track 406. The slide track 406 acts as a guide for the panoramic recording receiving slide 404. Slide 404 moves within the slide track by the drive arrangement which includes drive belt 422 which engages and drives the lower edge 424 of the slide 404. It is by movement of the drive belt caused by movement of the panoramic viewer 402 about the support post 432 that the position of the slide 404 changes in the direction generally indicated as 408. Thus, with relative movement of the viewer about the support post 432, there is also relative movement of the slide 404 within the slide track 406. Movement of the viewing head is shown by arrow 409.

An illuminating source 410 is provided to one side of the panoramic slide 404, with this illuminating source producing light which travels through the panoramic slide and is focused by the focusing arrangement 412. The light passing through the focusing arrangement 412 is reflected by back mirror 414 and the further back mirror 415 to strike the back lit screen, generally shown as 416.

Movement of the drive belt 422 with movement of the panoramic viewer 402 about the support post 432 is accomplished by the fixed sprocket 420 in combination with the forward drive belt wheels 426. Rotation of the viewer in the direction of arrow 409 causes a sympathetic movement of the drive belt which causes the slide 404 to move within the slide track. The user controls movement of the viewer by means of the operator handle 430. Thus, a portion of the panorama recorded on the slide 404 is viewed and as the viewer is rotated, a portion of the panorama is viewed which corresponds with the amount of angular movement of the viewer. If the viewer is rotated 360°, the panoramic record will return to its initial photographic location. This is accomplished in that the slide represents the panorama continuously a number of times. It is preferred that the panorama be reproduced on the slide three times thereby providing the user with flexibility for viewing of the panorama. Thus, if the user started at one end of the panorama and rotated three full turns, he would reach the other end of the slide and would have viewed the panorama three times. In most cases, the viewing will start near a central location, giving the user approximately 540° of viewing in a single direction of rotation of the viewer from the initial point.

Figure 21:
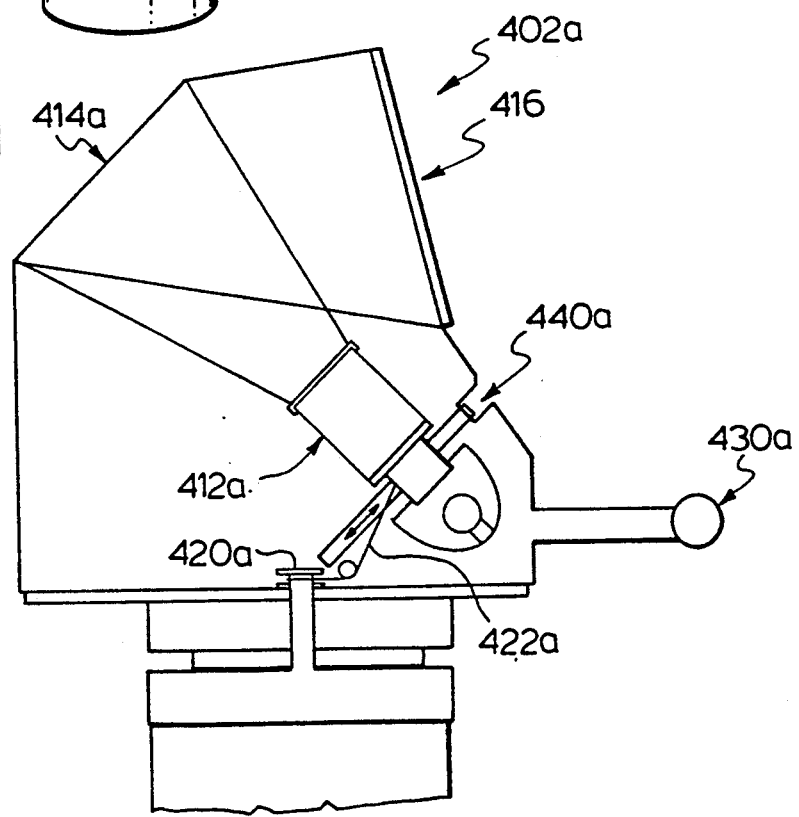
FIG. 21 is a side view showing the details of a multiple panoramic viewing arrangement.
Figure 22:
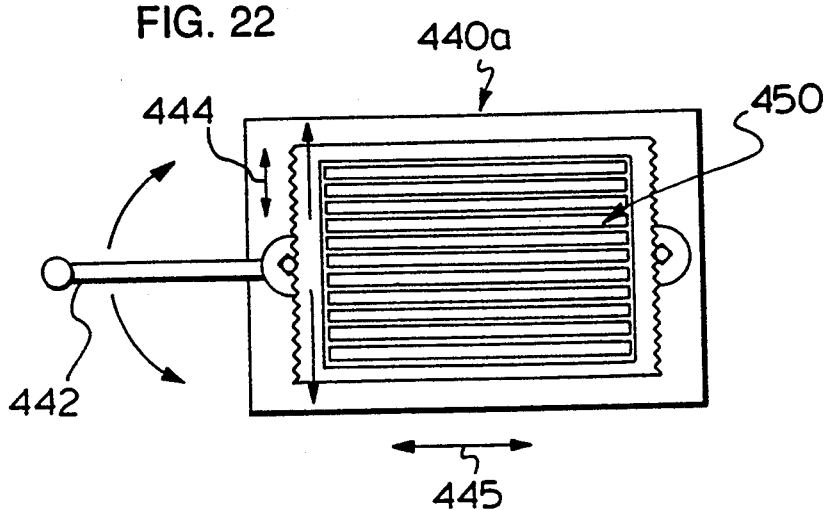
FIG. 22 is a top view of a multiple image holder for panoramic images.

A slightly different version of the slide viewer is shown in FIG. 21 and this viewer is capable of viewing multiple panoramas provided on a single slide. The viewer, shown as 402a, has a focusing arrangement, generally shown as 412a, a back mirror 414a and a back lit screen 416a. A multiple slide holder 440a is shown and the panoramic images are stored in strip form, as generally indicated in FIG. 22. The panoramic image to be scanned is controlled by the adjustment lever 442a which moves the panoramic images in the directions of arrow 444 of FIG. 22. Thus, different panoramic images may be stored and the multiple slide holder 440 allows selective viewing of the various panoramic images stacked one above the other. The individual panoramas are still scanned by the user in the manner described in FIG. 20 and as indicated by arrow 445, while scanning of different panoramas is controlled by the relative position of the viewer adjusted control handle 430a of FIG. 21. Thus, the user of the viewer of FIG. 21 can selectively scan one of the multiple panoramic images of FIG. 22 in a manner similar to that described with respect to FIG. 20, but may then view a completely different panorama by adjusting the multiple slide holder 440a via control handle 430a, bringing a new panoramic image in line with the lens and focusing arrangement 412a of FIG. 21.

Figure 23:
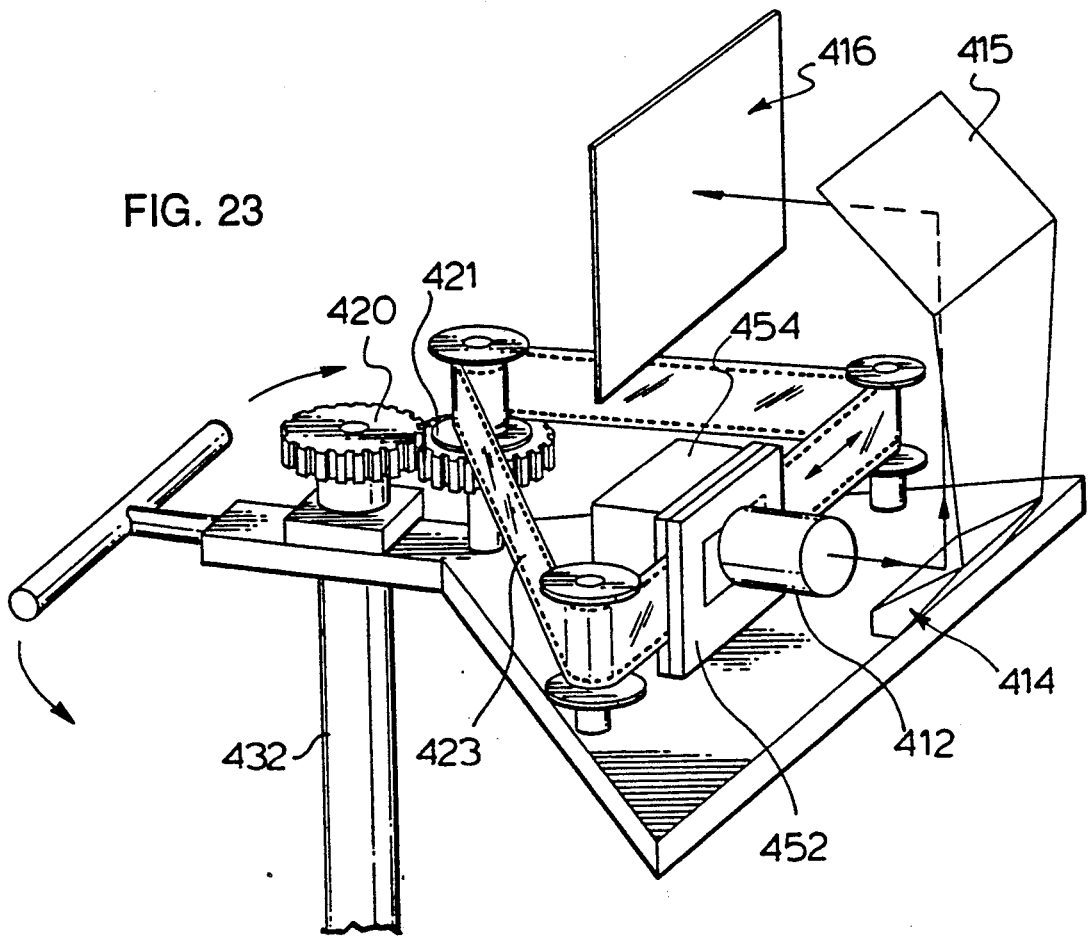
FIG. 23 is a partial perspective view of a viewing arrangement.

A further embodiment of the invention is shown in FIG. 23 where this embodiment of the viewer uses a closed loop film of one panorama, preferably recorded three times in a continuous manner. One 360° rotation of the viewer handle results in a corresponding 360° scanning of the panorama image. Again, with this panoramic viewer, a focusing arrangement 412 is provided to one side of a film gate 452 which positions the portion of the closed loop film 423 to be viewed. An illuminating arrangement 454 is provided to the opposite side of the continuous loop film 423 with the projected image being reflected by back mirror 414 and the further back mirror 415 for illumination on the back lit screen 416. With this arrangement, there is a fixed sprocket 420 in combination with a film drive sprocket 421 which, in turn, drives a spool arrangement for the closed loop film 423.

Figure 24:
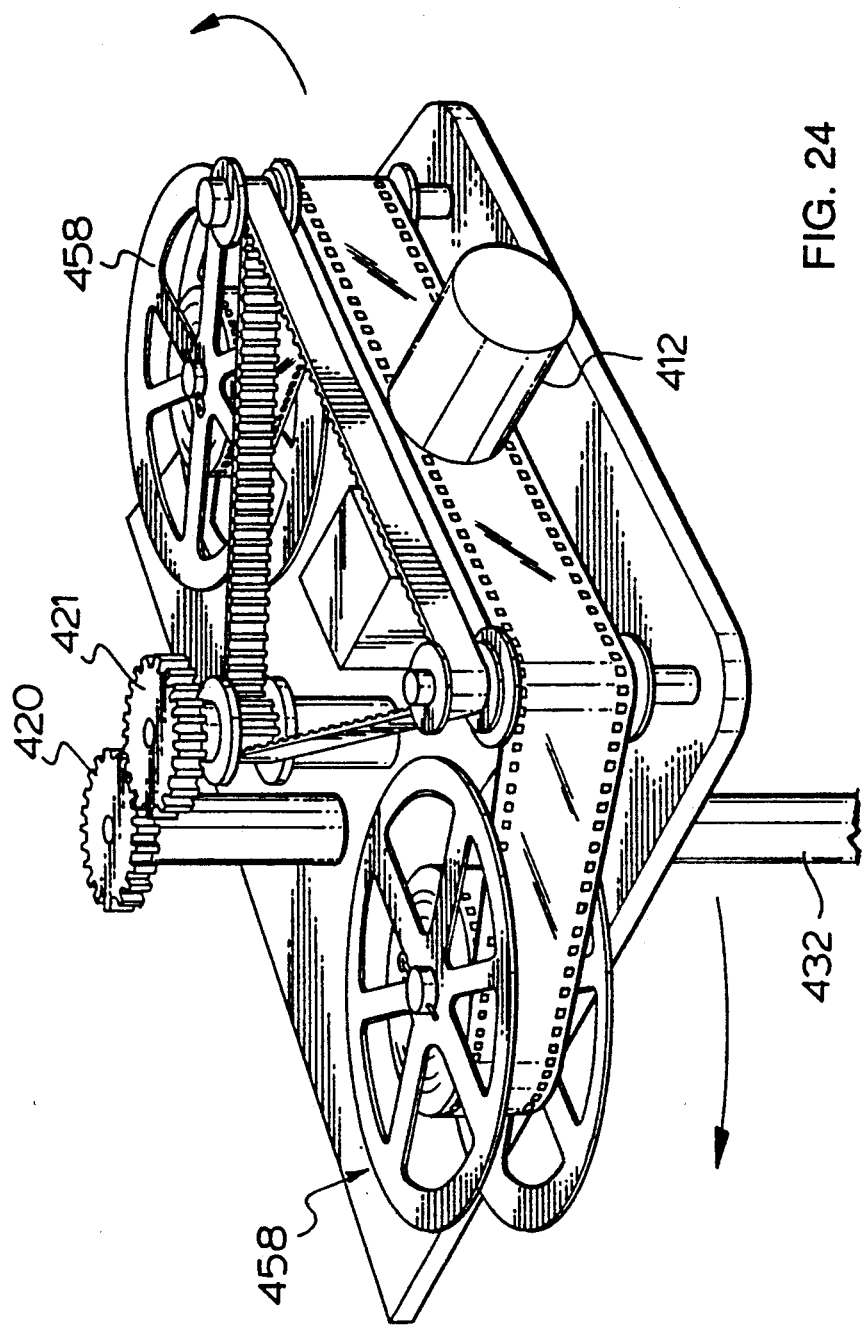
FIG. 24 is a partial perspective view of a reel type viewing arrangement.

A film reel arrangement is shown in FIG. 24 and uses the drive arrangement of FIG. 23 for advancing of the film from one of the reels 458 provided to either side of the viewer. In this case, the structure for directing the projected image to a back lit screen or for direct viewing has not been shown.

Figure 25:
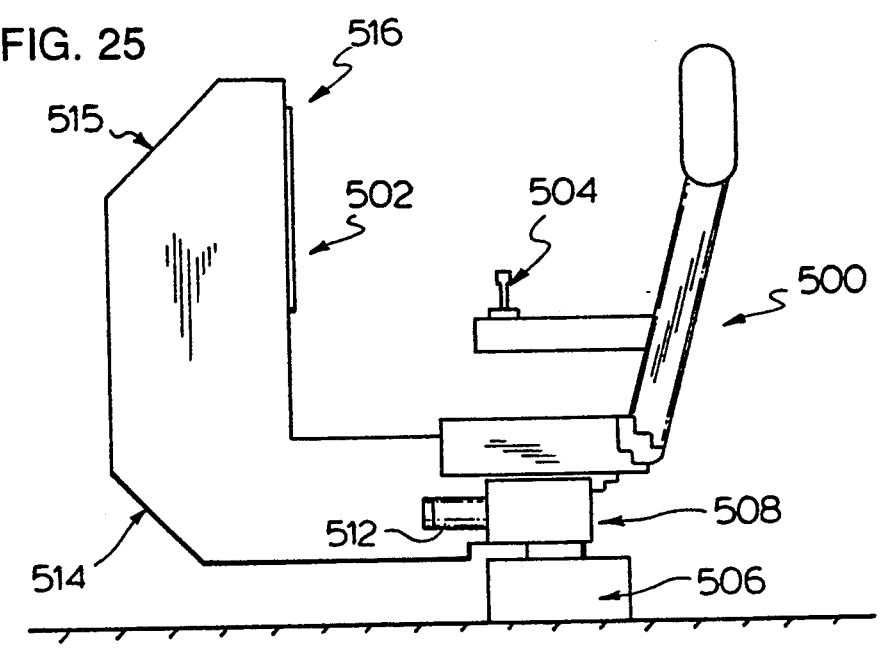
FIG. 25 is a side elevation depicting a motorized viewing arrangement.

The viewing arrangement of FIG. 25 uses the chair 500 attached to a viewing arrangement 502 and the user controls the angular orientation of the device in the horizontal plane by means of the controller 504. A drive 506 is provided beneath the chair 500 and the panoramic slide and the projecting arrangement is located below the chair and is indicated as 508. As the chair and viewing screen are rotated, the panoramic image is scanned to produce a corresponding angular movement of the panorama which is displayed on the back lit screen, shown as 516. The image is projected by means of the focusing arrangement 512 which directs the image to the back mirror 514 and to the further back mirror 515 for projection on the back lit screen 516. The controller 504 also allows the user to scan different panorama images and controls the position of the multiple slide located in the projecting arrangement 508.

The panoramic images are recorded by means of a slit scan camera. These cameras are well known in the art and can produce the continuous recorded panorama images discussed with respect to the preceding structures.

Figure 26:
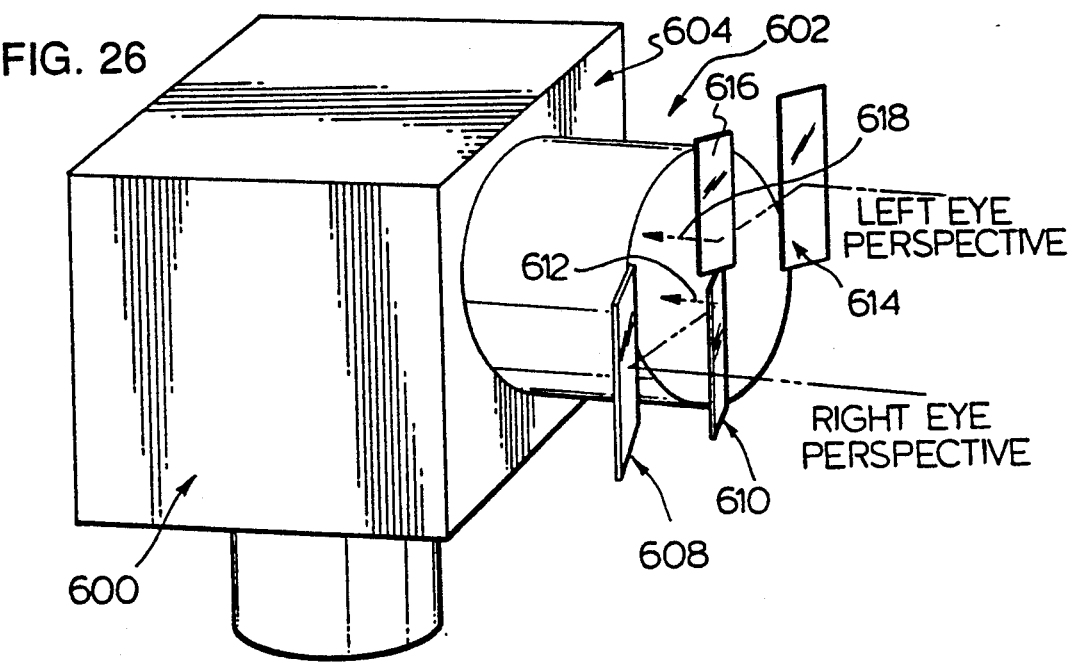
FIG. 26 is a three-dimensional view showing a modified slit scan camera.
Figure 27:
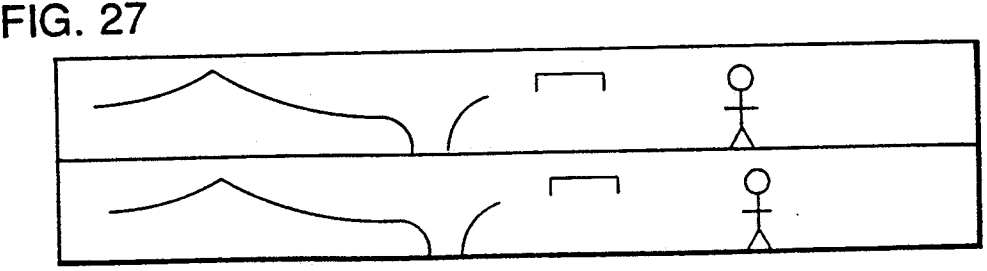
FIG. 27 is a depiction of two panoramic images.
Figure 30:
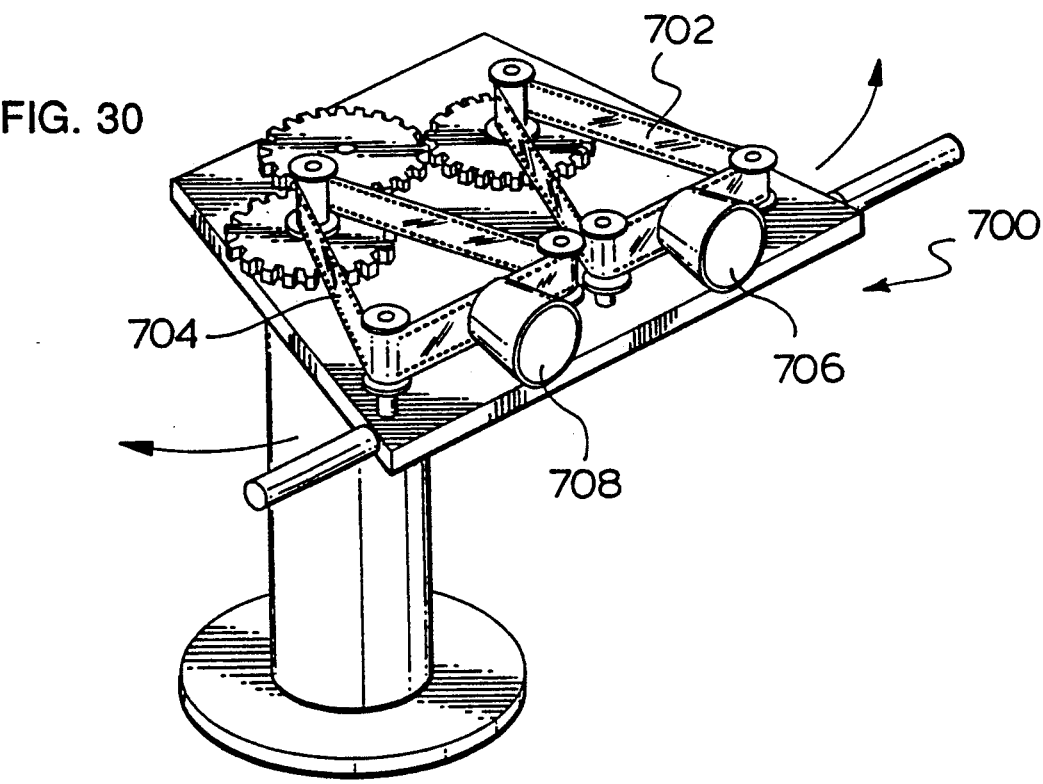
FIG. 30 is a partial perspective of the components of a stereoscopic display device.
Figure 31:
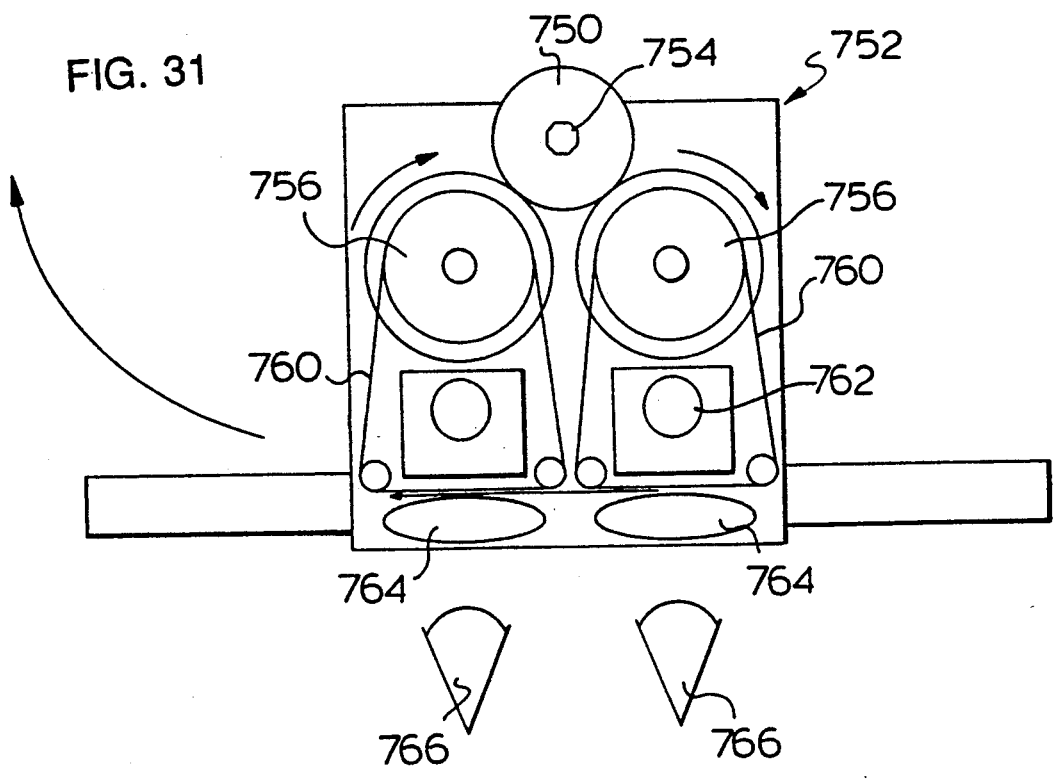
FIG. 31 is a top view of a stereoscopic display device.

A modification to a slit scan camera is shown in FIG. 26 where the camera produces a left eye perspective and a right eye perspective as two separate recordings on the film. With this arrangement, the viewer can be modified as shown in FIGS. 30 and 31 to allow stereoscopic display. The slit scan camera 600 includes a focusing arrangement 602 and a recording housing 604. The focusing arrangement 602 includes an outside righthand mirror 608 which cooperates with a inside righthand mirror 610 to direct the image within the housing aligned in the manner indicated by arrow 612. A similar arrangement is provided to the opposite side of the lens arrangement where there is a lefthand outside mirror 614 cooperating with an inside lefthand mirror 616 for directing that image in the manner indicated by arrow 618. The film, located within the recording housing 604, is generally shown in FIG. 27 and one panoramic image is recorded above the other one. In this case, the left eye perspective is on top and the right eye perspective is below. As shown in FIG. 27, there is a slight horizontal shift of the right and left images and this will produce a stereoscopic effect when viewed. The recording above and below into two separate images is accomplished in that the inside mirrors 610 and 616 are of half the height of the focusing arrangement 602. The embodiment of FIG. 28 and 29 illustrates a mirror arrangement which can be used for recording of a righthand panoramic image in FIG. 28 which can then be followed by the lefthand panorama with the structure shown in FIG. 29. With this arrangement, the center mirror 520 is pivotal from the left position to the right position. The operator first records one panorama in one position of the center mirror 520 and then records the same panorama with the mirror in the other position. This will produce two panoramas having the necessary separation therebetween whereby simultaneous viewing will produce a stereoscopic effect.

Several arrangements are possible for viewing of stereo panoramic images. One such structure is shown in FIG. 30 by the viewer generally shown as 700. In this case, two continuous looped films, shown as 702 and 704, are provided which are each driven by a common drive arrangement to effect rotation of the film past the separate focusing arrangements 706 and 708. The closed loop film 702 and 704 will have the necessary shift therebetween to effect the desired stereoscopic effect. The device continues to operate in the manner whereby rotation about the center axis causes a movement of not only the viewing lenses 706 and 708, but a sympathetic movement of the film record to effect the desired visual effect by viewing through the separate lenses. With the embodiment in shown in FIG. 31, there is a fixed gear 750 secured to the stationary base, with the platform 752 rotational about point 754. Rotatable gears 756 are secured to the platform 752. These gears will rotate with movement about the stationary gear 750 and cause the appropriate movement of the film loops 760. Behind each of these film loops 760 is a light source, shown as 762, which projects through the film with the projected image being focused by magnifiers 764 and subsequently viewed by the eyes 766 of the user. This provides a fairly simplified unit which allows three-dimensional viewing of a recorded panoramic image suitable for use with the stereoscopic viewer. Selective viewing of multiple panoramas is also possible and would preferably follow the principles described with reference to FIG. 22, but modified for the particular panoramic recording format.

As can be appreciated with this system, a viewing of a analog type film record of a panorama is accomplished wherein the film record has very high accuracy and excellent detail. In the simple embodiment lenses ar used and projecting arrangements are used for viewing of the panorama. In the more sophisticated system a video display camera is coordinated with a display monitor and optionally with a laser disc player or other type medium for coordination of panoramic viewing and linking of various different panoramas in combination with a film record indicating movement from one particular location to another which would occur in order to physically move to the location of the new panorama.

The film record has been described as having the different panoramas end to end but it can be appreciated that these panoramas can be stacked on a wider film record and changing from one panorama to a different panorama can be accomplished by viewing of a different track of the film record. Thus the film record could have a number of parallel panorama tracks and either the camera or the film is moved for selective viewing of a particular track. Each of the panoramas can have a number of points or have a signal associated with particular points that provides the user with the necessary information to indicate that there is a different panorama associated with that point, should he choose to go to it. This system also allows the user to zoom in and out of a particular panorama should he wish to see further detail in the film record.

In the embodiments described the viewer is panned either horizontally or optionally vertically by the user directly controlling movement of the monitor or viewing arrangement. Also the panning of the image is smooth due to scanning of the film which is physically moved or relatively moved past the viewing window. This arrangement avoids "glitches" or "jitter" that can occur when scanning a digitized and stored panorama image and more closely follows the normal vision of a person panning a particular panorama.

Although preferred embodiments to the invention have been described herein, it will be understood by those skilled in the art that variations will be made thereto without departing from the spirit of the invention of the scope of the appended claims.

What is claimed is:

1. An image viewing system for viewing images recorded on a film record in a particular known angular relationship, said viewing system comprising a rotatable viewing head for selective viewing of portions of the film record as a function of the angular position of the viewing head and means for mounting the film record within the viewing head and coordinating the film record with the angular position of the viewing head such that the viewing head selectively directly scans, by angular movement of the viewing head, portions of the film record having an angular relationship corresponding to the angular relation produced by the angular movement of the viewing head.

2. An image viewing system as claimed in claim 1 wherein said film record is of a 360° panorama and said film record is driven to move as a function of the angular movement of said viewing head.

3. An image viewing system as claimed in claim 2 wherein said film record has the same panorama linked several times whereby the complete panorama may be viewed and partially reviewed again while rotating said viewing head in the same rotational direction, said rotatable viewing head being freely rotatable about a rotary axis thereof.

4. An image viewing system as claimed in claim 3 wherein said film record is a continuous loop and the panorama recorded three times.

5. An image viewing system as claimed in claim 3 wherein said film record is in a strip form having a beginning and end.

6. An image viewing system as claimed in claim 3 wherein said film record is in the form of a panoramic slide which is selectively viewed.

7. An image viewing system as claimed in claim 6 wherein said film record includes multiple panorama images stacked one above the other with each panoramic image being of a different panorama.

8. An image viewing system as claimed in claim 7 wherein said viewing head is coupled by a drive belt arrangement to drive cogs in engagement with drive sprockets of said film record, said drive belt arrangement and said drive sprockets of said film record maintaining said film record in alignment with said viewing head.

9. An image viewing system as claimed in claim 7 wherein each panoramic image of said film record has two corresponding panoramic segments of a single panorama for simultaneous viewing by said viewing means, one image being viewed by a right eye viewer and the other image being viewed by a left eye viewer, with said corresponding panoramic segments having a relative shift therebetween to simulate a three-dimensional view of said single panorama.

* * * * *